US009818052B2

(12) United States Patent
Kishimoto

(10) Patent No.: US 9,818,052 B2
(45) Date of Patent: Nov. 14, 2017

(54) IMAGE FORMING APPARATUS FOR PRINTING COPY OF ID CARD WITH UTLIZATION PURPOSE TEXT OVERLAPPED THEREON, AND IMAGE FORMING METHOD AND TANGIBLE COMPUTER-READABLE RECORDING MEDIUM FOR THE SAME

(71) Applicant: KONICA MINOLTA, INC., Chiyoda-ku, Tokyo (JP)

(72) Inventor: Kazuhisa Kishimoto, Mitaka (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/180,256

(22) Filed: Feb. 13, 2014

(65) Prior Publication Data
US 2014/0233047 A1    Aug. 21, 2014

(30) Foreign Application Priority Data
Feb. 15, 2013    (JP) .................................. 2013-027990

(51) Int. Cl.
G06F 17/24    (2006.01)
G06K 15/02    (2006.01)
H04N 1/00    (2006.01)

(52) U.S. Cl.
CPC ..... G06K 15/1889 (2013.01); H04N 1/00209 (2013.01); H04N 1/00838 (2013.01)

(58) Field of Classification Search
None
See application file for complete search history.

(56) References Cited

U.S. PATENT DOCUMENTS

| 6,026,187 | A  | * | 2/2000 | Siegel ........................... 382/213 |
| 6,314,203 | B1 | * | 11/2001 | Mikuni ................... G06T 11/00 358/523 |
| 6,415,039 | B2 |   | 7/2002 | Uraki et al. |
| 7,965,402 | B2 | * | 6/2011 | Saito ..................... G06F 3/1208 358/1.14 |

(Continued)

FOREIGN PATENT DOCUMENTS

| CN | 201080045 Y | 7/2008 |
| CN | 102498711 A | 6/2012 |

(Continued)

OTHER PUBLICATIONS

R.G. Casey and D.R. Ferguson, Intelligent Forms Processing, IBM Systems Journal Volo. 29, No. 3, 1990, pp. 435-450.*

(Continued)

*Primary Examiner* — Paul F Payer
(74) *Attorney, Agent, or Firm* — Holtz, Holtz & Volek PC

(57) ABSTRACT

Disclosed is an image forming apparatus including: an image obtaining unit configured to obtain an image of an identification card; a printing unit; a utilization purpose entry receiving unit configured to receive an entry of a utilization purpose of a document to be printed by the printing unit; and a control unit configured to overlap a text indicating the utilization purpose received by the utilization purpose entry receiving unit, with the image of the identification card, and to instruct the printing unit to print the overlapped text and the image of the identification card.

32 Claims, 18 Drawing Sheets

(56) References Cited

U.S. PATENT DOCUMENTS

| | | | |
|---|---|---|---|
| 8,009,305 B2* | 8/2011 | Ishikawa et al. | 358/1.14 |
| 2005/0179961 A1* | 8/2005 | Czyszczewski et al. | 358/468 |
| 2007/0195370 A1* | 8/2007 | Suga et al. | 358/1.18 |
| 2012/0162684 A1 | 6/2012 | Matulic et al. | |
| 2013/0063736 A1* | 3/2013 | Chiba | G06T 11/60 358/1.6 |

FOREIGN PATENT DOCUMENTS

| | | | |
|---|---|---|---|
| JP | 11-075050 A | | 3/1999 |
| JP | 2000-099751 A | | 4/2000 |
| JP | 2000099751 | * | 4/2000 |
| JP | 2005039611 A | | 2/2005 |
| JP | 2005321908 A | | 11/2005 |
| JP | 2007074088 A | | 3/2007 |
| JP | 2007-166217 A | | 6/2007 |

OTHER PUBLICATIONS

Japanese Office Action dated Dec. 19, 2014, issued in counterpart Japanese Application No. 2013-027990.

Chinese Office Action (and English translation thereof) dated Sep. 27, 2016, issued in counterpart Chinese Application Application No. 201410048355.8.

Chinese Office Action (and English translation thereof) dated Mar. 28, 2017 issued in counterpart Chinese Application No. 201410048355.8.

How to use WORD2003 to make watermark, "baidu Experience", "http://jingyan.baidu.com/article/425e69e69c2bfabel5fc1633.html" pp. 1-6.

Chinese Office Action (and English translation thereof) dated Feb. 22, 2016, issued in counterpart Chinese Application No. 201410048355.8.

* cited by examiner

FIG.17

| ORIGINAL TYPE | PAPER SIZE | SIDE TO BE PRINTED | IMAGE AREA | PICTURE IMAGE | PICTURE AREA |
|---|---|---|---|---|---|
| DRIVING LICENSE | (x0,y0) – (x9,y9) | FRONT/BACK | (x10,y10) – (x20,y20) (x11,y11) – (x21,y21) | YES | (x12,y13) – (x22,y22) |
| PASSPORT | (x0,y0) – (x9,y9) | SPREAD | (x30,y30) – (x40,y40) | YES | (x32,y32) – (x42,y42) |
| HEALTH INSURANCE CARD | (x0,y0) – (x9,y9) | FRONT/BACK | (x50,y50) – (x60,y60) (x51,y51) – (x61,y61) | NO | – |

IMAGE FORMING APPARATUS FOR PRINTING COPY OF ID CARD WITH UTLIZATION PURPOSE TEXT OVERLAPPED THEREON, AND IMAGE FORMING METHOD AND TANGIBLE COMPUTER-READABLE RECORDING MEDIUM FOR THE SAME

BACKGROUND OF THE INVENTION

Field of the Invention

The present invention relates to an image forming apparatus, an image forming method and a tangible computer-readable recording medium for printing an image by overlapping a text with the image.

Description of Related Art

In People's Republic of China, the resident identification card is issued for each of citizens aged 16 or above. As the most general certificate, a citizen is required to show the resident identification card in various life events, such as a procedure for opening a bank account, a procedure for using a hotel, or the like. At this time, an applicant prepares a copy of the resident identification card and submits the copy with the original to a contact person. The contact person confirms whether the original is coincident with the copy, and receives only the copy and returns the original to the applicant when the original is coincident with the copy. Thereby, the contact person accepts the application from the applicant.

However, the copy to be strictly managed by a party which accepts the application could be brought out by an ill-willed person. As a result, the problem in which the copy is illegally diverted is caused. Therefore, in order to prevent the above illegal diversion of the copy, in general, an applicant adds the utilization purpose to the copy and submits it with the application. Because an applicant takes a troublesome task for adding the utilization purpose in handwriting every when the copy is submitted (for example, in case that a plurality of copies are prepared), it is required to automatically print the utilization purpose when the copy is prepared.

As a method for automatically printing the text in an image, for example, the following method is disclosed in Japanese Patent Application Publication No. 2000-99751. In the method, the blank space of the image data is automatically detected and the text and the like is printed in the detected blank space. Therefore, the troublesome task for searching the blank space by a user can be saved.

In case that an identification card is copied by the method disclosed in Japanese Patent Application Publication No. 2000-99751, as shown in the copy 100E of FIG. 18, the text 110E indicating the utilization purpose is printed in the blank space, that is, a portion except the portion indicating the contents of the identification card (the portion except the front image 101 and the back image 102).

However, in case that the text 110E indicating the utilization purpose is not overlapped with the portion indicating the contents of the identification card (the front image 101 and the back image 102), the text 110E indicating the utilization purpose is easily cut off from the other portions. Therefore, the illegal diversion of the copy cannot be prevented.

SUMMARY

To achieve at least one of the abovementioned objects, an image forming apparatus reflecting one aspect of the present invention comprises:

an image obtaining unit configured to obtain an image of an identification card;

a printing unit;

a utilization purpose entry receiving unit configured to receive an entry of a utilization purpose of a document to be printed by the printing unit; and a control unit configured to overlap a text indicating the utilization purpose received by the utilization purpose entry receiving unit, with the image of the identification card, and to instruct the printing unit to print the overlapped text and the image of the identification card.

Preferably, the image forming apparatus further comprises a judging unit configured to judge whether a first image obtained by the image obtaining unit is the image of the identification card, wherein only in case that the judging unit judges that the first image is the image of the identification card, the control unit overlaps the text indicating the utilization purpose received by the utilization purpose entry receiving unit, with the first image, and instructs the printing unit to print the overlapped text and the first image.

Preferably, the control unit overlaps the text so as to spread on a blank space and the image of the identification card, and instructs the printing unit to print the overlapped text and the image of the identification card.

Preferably, the control unit overlaps the text with the image of the identification card so as to avoid the text from being overlapped with a predetermined element in the image of the identification card.

Preferably, the utilization purpose entry receiving unit receives the entry of the utilization purpose by receiving a selection of one option among a plurality of options, or by entering the utilization purpose in handwriting.

Preferably, the judging unit judges whether the first image is the image of the identification card, by analyzing the first image or by receiving a designation in which the first image is the image of the identification card, through the utilization purpose entry receiving unit.

Preferably, the image obtaining unit comprises a scanner unit, and obtains the image of the identification card by optically reading the identification card.

Preferably, the image obtaining unit comprises a communication unit configured to communicate with an external device, and obtains the image of the identification card from the external device by communicating with the external device.

Preferably, the control unit overlaps the text with the image of the identification card so as to avoid the text from being overlapped with the predetermined element, by analyzing the image of the identification card.

Preferably, the image forming apparatus further comprises a storing unit configured to previously register an arrangement pattern of each element in the image of the identification card, with respect to each type of the identification card, wherein the judging unit judges the type of the identification card, and the control unit overlaps the text with the image of the identification card so as to avoid the text from being overlapped with the predetermined element in accordance with the arrangement pattern corresponding to the type which is judged by the judging unit.

Preferably, the identification card is a certificate selected from a group consisting of a driving license, a passport, a health insurance card, a basic resident registration card and a resident identification card.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 17 is a view showing the area management table in which the coordinate information relating to the image area and the picture area is registered with respect to each type of identification card.

DETAILED DESCRIPTION OF PREFERRED EMBODIMENTS

Hereinafter, a preferred embodiment of the present invention will be explained with reference to the accompanying drawings.

Figure 1:
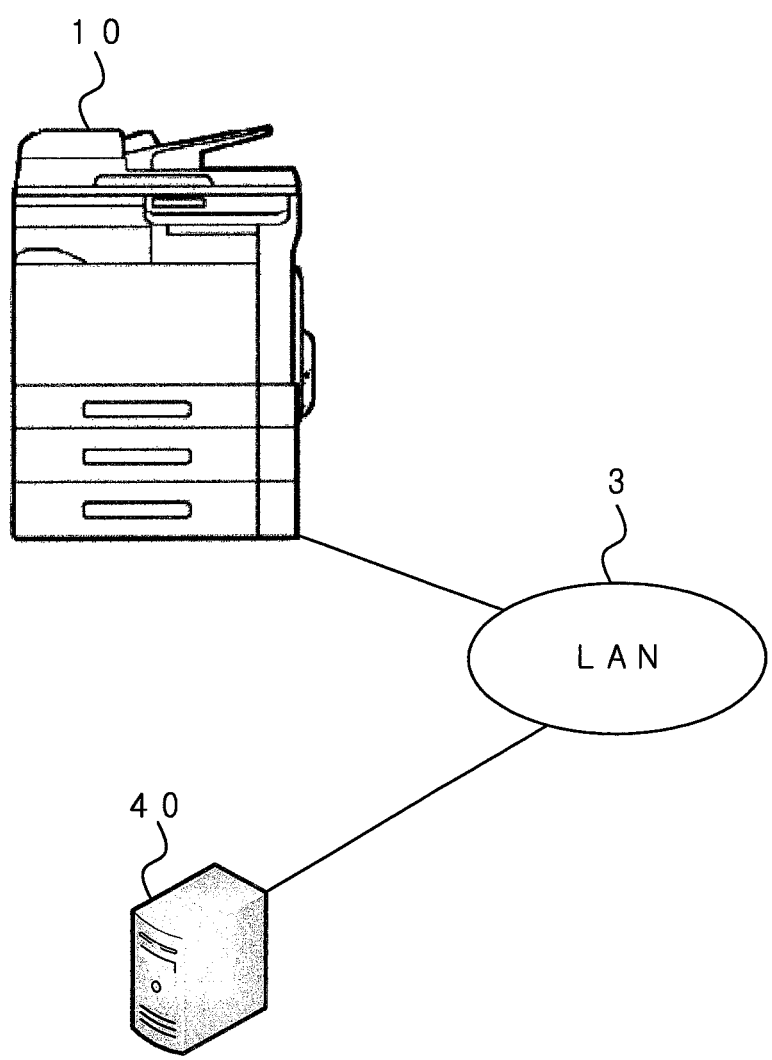
FIG. 1 is an explanatory view showing the situation in which the image forming apparatus according to the embodiment is connected with a server via a network.

FIG. 1 shows the image forming apparatus 10 according to the embodiment and the server 40. The image forming apparatus 10 is connected with the server 40 via a LAN (Local Area Network) 3.

The image forming apparatus 10 is a so-called multi-function peripheral having a function of executing jobs, such as a copy job for printing an image on recording paper by optically reading an original (a job for preparing a copy of the original), a scan job for obtaining image data by reading an original to store the image data as a file or to transmit the image data to an external device, a print job for printing out an image on the recording paper in accordance with the data received from the PC or the like, and the like.

In the server 40, the arrangement information (arrangement pattern) relating to the arrangement of each element, such as a picture portion, the text and the like in an identification card, is registered with respect to each type of identification card as a fixed form.

In case that the image forming apparatus 10 outputs a copy in accordance with a copy job, when the read original is an identification card, the image forming apparatus 10 receives the entry of the utilization purpose of the copy from the user. Then, the image forming apparatus 10 overlaps the text indicating the received utilization purpose with the image of the original and prints the text and the image of the identification card. Because the copy in which the text indicating the utilization purpose cannot be easily cut off from the image of the identification card (copied image) is prepared, it is possible to prevent the diversion of the copy for purpose except the printed utilization purpose.

Further, the image forming apparatus 10 recognizes the position (area) of the picture portion which is one of the predetermined elements in the identification card, by referring the fixed forms registered in the server 40. Then, the image forming apparatus 10 overlaps the text indicating the utilization purpose with the copied image of the identification card so as to avoid the text from being overlapped with the picture portion. Therefore, it is possible to visually recognize the picture portion in the copy of the identification card.

Next, the configuration of the image forming apparatus 10 will be explained.

Figure 2:
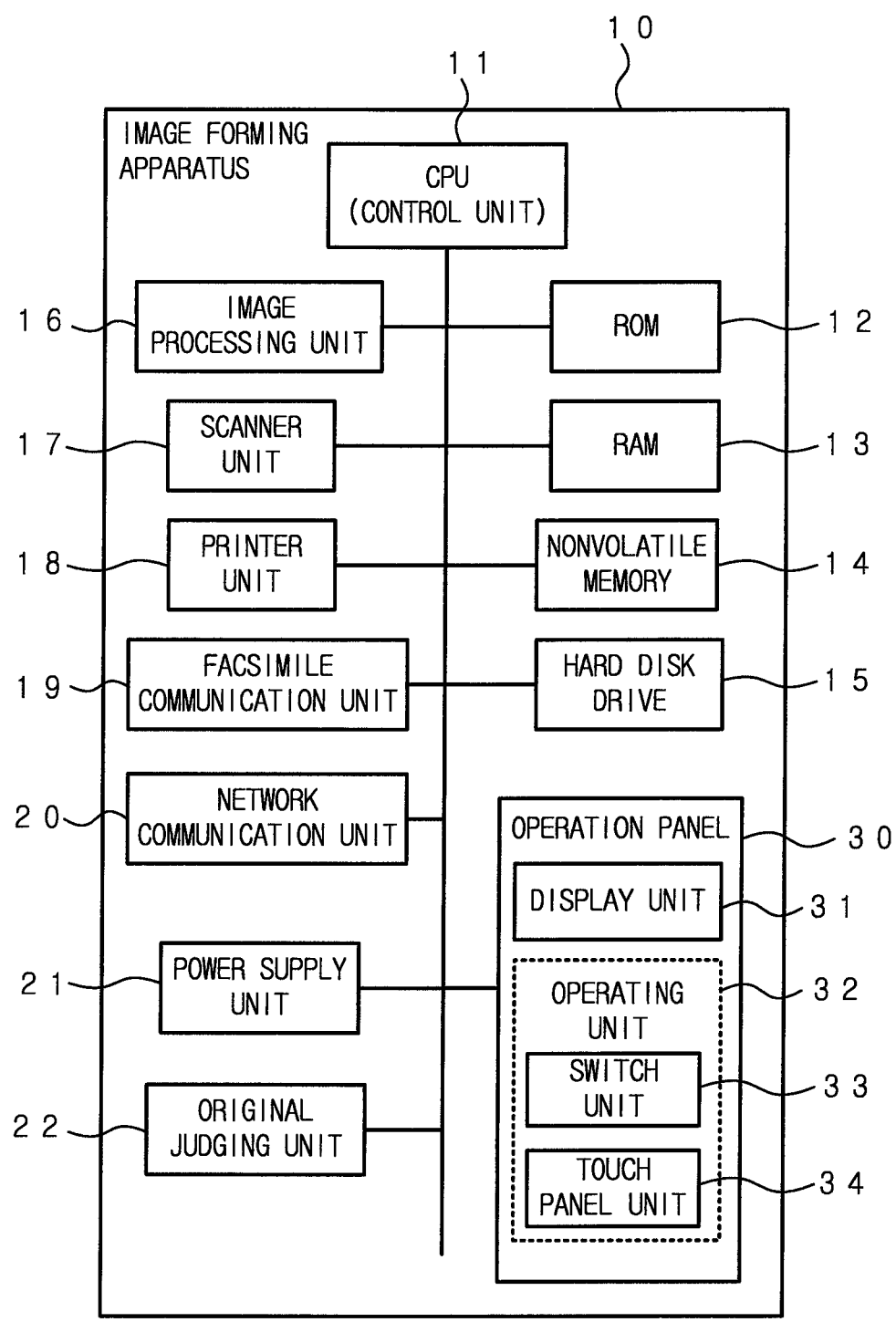
FIG. 2 is a block diagram showing the schematic configuration of the image forming apparatus according to the embodiment.

FIG. 2 is a block diagram showing the schematic configuration of the image forming apparatus 10 according to the embodiment. The image forming apparatus 10 comprises a CPU (Central Processing Unit) 11 for entirely controlling the operation of the image forming apparatus 10. The CPU 11 is connected with a ROM (Read Only Memory) 12, a RAM (Random Access Memory) 13, a nonvolatile memory 14, a hard disk drive 15, an image processing unit 16, a scanner unit 17, a printer unit 18, a facsimile communication unit 19, a network communication unit 20, a power supply unit 21, an original judging unit 22 and an operation panel 30 via a bus.

By the CPU 11, a middleware, application programs, and the like are executed on an OS (Operating System) program as a base. Further, the CPU 11 has a function of the control unit for overlapping the text indicating the utilization purpose with the image of the identification card and for instructing the printer unit 18 to print the overlapped text and the image of the identification card. In the ROM 12, various types of programs are stored. By carrying out various types of processes by the CPU 11 in accordance with these programs, each function of the image forming apparatus 10 is realized. Further, in the ROM 12, the program for executing a series of the control of the image forming apparatus 10 by the CPU 11, is stored.

The RAM 13 is used as a work memory for temporarily storing various data when the CPU 11 carries out the process in accordance with the programs, and an image memory for storing image data.

The nonvolatile memory 14 is a memory (flash memory) in which the stored contents are not damaged even if the image forming apparatus 10 is turned off. The nonvolatile memory 14 is used for storing various types of setting information, and the like. The hard disk drive 15 is a large-capacity nonvolatile storing device. In the hard disk drive 15, the OS program, various types of application programs, user information, print data, image data, information history relating to the jobs, and the like are stored.

The image processing unit 16 carries out the rasterizing process for converting print data into image data, the compression/decompression process for the image data, and the like in addition to the processing, such as the enlargement/reduction or the rotation of image data.

The scanner unit 17 has a function of obtaining image data by optically reading an image of an original. The scanner unit 17 comprises, for example, a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like. In this embodiment, before the scanner unit 17 reads the original, the user sets the original (the document to be copied) to the ADF (Auto Document Feeder) or on the platen glass. In case that the original is set to the ADF, the image data is obtained by feeding the original with the ADF and by moving the original relative to the reading position to read the original. In case that the original is set on the platen glass, the original is read in the state in which the original is disposed on the platen glass to obtain the image data. Further, the scanner unit 17 has the function of the scanner unit of the image obtaining unit for obtaining the image of the identification card in case that the original is the identification card. Specifically, the scanner unit 17 obtains the image of the identification card by optically reading the identification card.

The printer unit 18 has a function of the printing unit for forming an image on the recording paper in accordance with the image data. In this embodiment, the printer unit 18 is configured as a so-called laser printer comprising a conveying device for the recording paper, a photoconductive drum, a charging device, a laser unit, a developing device, a transfer and separation device, a cleaning device, and a fixing device. The laser printer forms an image by the electrophotographic process. An image may be formed by another process.

The facsimile communication unit 19 has a function of transmitting and receiving the image data to/from an external device having the facsimile function via the public line.

The network communication unit 20 has a function of communicating data with the server 40 and other external devices via a network, such as the LAN 3. Further, the network communication unit 20 has the function as the communication unit of the image obtaining unit, which obtains the image of the identification card from an external device by communicating with the external device.

The power supply unit 21 has a function of supplying the electric power to the image forming apparatus 10. The electric power is supplied by connecting the power supply with a connector.

The original judging unit 22 judges whether the image (first image) read by the scanner unit 17 is the image of the identification card, as the judging unit. Further, the original judging unit 22 obtains the arrangement information relating to the arrangement of each element, such as the picture potion, the text and the like in the image, by analyzing the image. The original judging unit 22 checks the obtained arrangement information by using the fixed forms received from the server 40. In case that there is a fixed form which is matched with the arrangement information, the original judging unit 22 judges that the image is an image of the identification card corresponding to the matched fixed form. That is, in the above judgment, the judgment for judging whether the read original is the identification card and the judgment for judging the type of identification card in case that the original is the identification card, are carried out.

The operation panel 30 comprises a display unit 31 and an operating unit 32. The operating unit 32 comprises a switch unit 33, such as a start button and the like, and a touch panel unit 34. The display unit 31 is configured by a liquid crystal display (LCD) and the like, and has a function of displaying various types of operation windows, setting windows, and the like. The CPU 11 controls the display contents which are displayed on the operation panel 30, and the reception of the operation through the operation panel 30.

The touch panel unit 34 is provided on the display unit 31. The touch panel unit 34 detects the touch position (coordinate position) on which the display unit 31 is pressed down by using a touch pen, the user's finger or the like, and detects a flick operation, a drag operation, and the like. Further, the CPU 11 recognizes the handwriting input which is input by the user, in accordance with the change in the touch position (operation information) which is continuously detected. The operation panel 30 has the function of the utilization purpose entry receiving unit for receiving the entry of the utilization purpose of the document to be printed by the printer unit 18.

Next, the copy of the identification card, which is prepared by the image forming apparatus 10, will be explained.

FIGS. 3 to 6 show various arrangements of the text in case that the text indicating the utilization purpose is overlapped with the image of the identification card. In FIGS. 3 to 6, the copies (100A to 100D) are ones which are prepared by copying the same identification card. However, the texts indicating the utilization purpose (utilization purpose texts 110A to 110D) are different in the arrangement thereof.

The common points of the copies 110A to 100D are explained. Firstly, in the copies 100A to 100D, as the images of the identification card, the front image 101 is printed in the upper area of the paper, and the back image 102 is printed in the lower area of the paper. Further, the front image 101 and the back image 102 are arranged so as to enclose the front image 101 and the back image 102 by the blank space of the paper in four directions which are the upper, the lower, the right and the left directions, respectively.

In the front image 101, the personal information (individual data/name, gender, date of birth, address and ID number) relating to the ID card is shown. In the back image 102, the information indicating the type of identification card, and the like is shown. Further, in the upper right area of the front image 101, the picture portion 103 is arranged. In the picture portion 103, the picture of the person which is identified by the identification card is attached.

In the copies 100A to 100D, the positions on which the text indicating the utilization purpose (the utilization purpose texts 110A to 110D) is overlapped with the image of the identification card are different from each other. However, in any of the copies 100A to 100D, the above text is overlapped with the image of the identification card (the front image 101 or the back image 102) so as not to overlap the text with the picture portion 103. That is, the CPU 11 overlaps the text with the image of the identification card so as to avoid the text from being overlapped with the picture portion 103 which is one of the predetermined elements in the image of the identification card. Further, each of the utilization texts 110A to 110D is overlapped so as to spread on the blank space and the image of the identification card (the front image 101 and/or the back image 102). That is, the CPU 11 overlaps the text with the image of the identification card so as to spread on the blank space and the image of the identification card, and instructs the printer unit 18 to print the overlapped text and the image of the identification card.

Each arrangement of the utilization purpose texts 110A to 110D (arrangement pattern) in the copies 100A to 100D shown in FIGS. 3 to 6, is explained.

<Arrangement Pattern 1>

Figure 3:
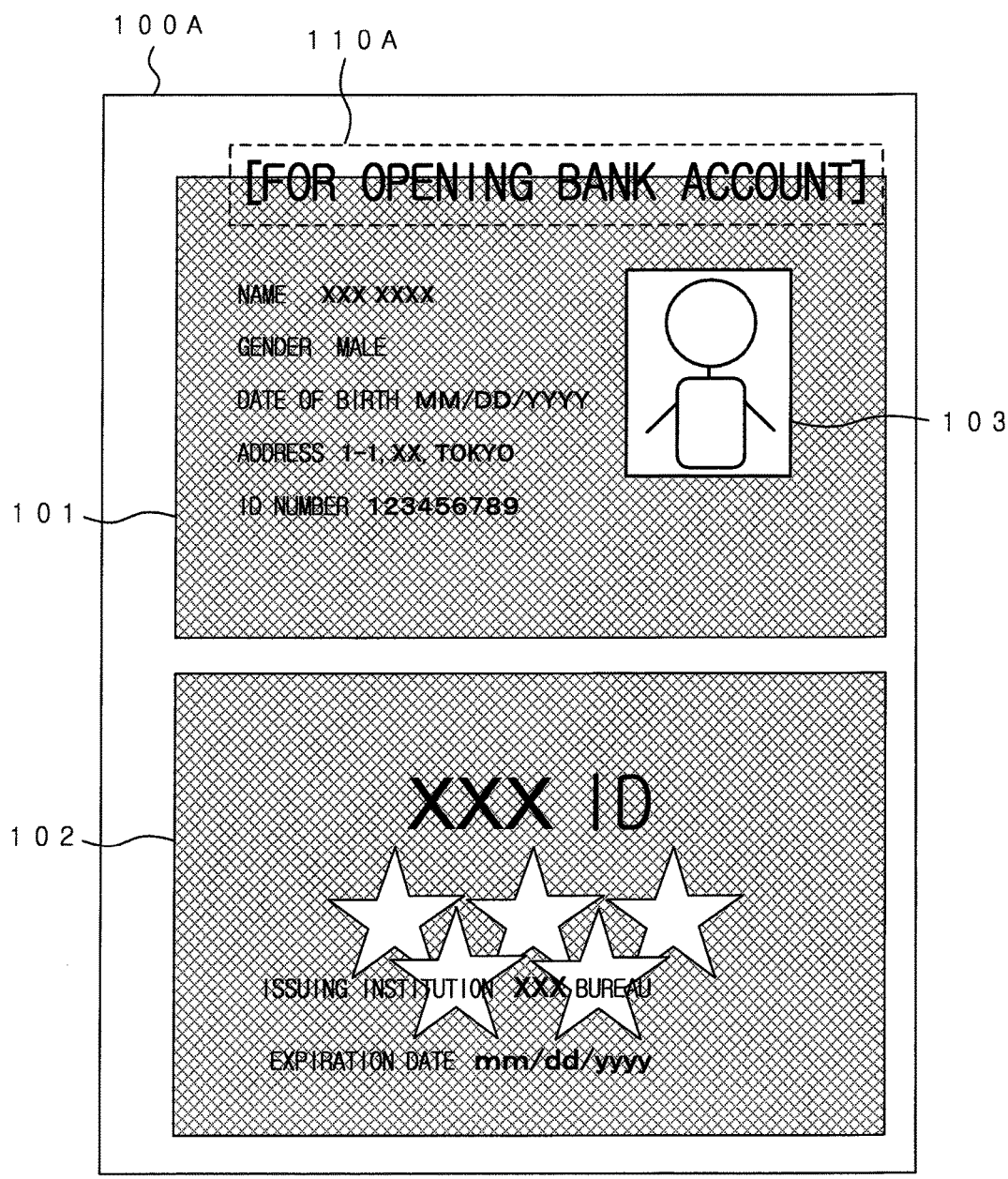
FIG. 3 is a view showing an example of the copy which is printed by the image forming apparatus according to the embodiment.

In the copy 100A of FIG. 3, the utilization purpose text 110A is overlapped on the upper portion of the front image 101 so as to spread on the blank space which is positioned on the outer side of the front image 101. Because the characters are not arranged on the edge of the image of the identification card in general, it is possible to synthesize the utilization purpose text 110A with the image of the identification card so as to avoid the text 110A from being overlapped with the characters described in the image of the identification card.

<Arrangement Pattern 2>

Figure 4:
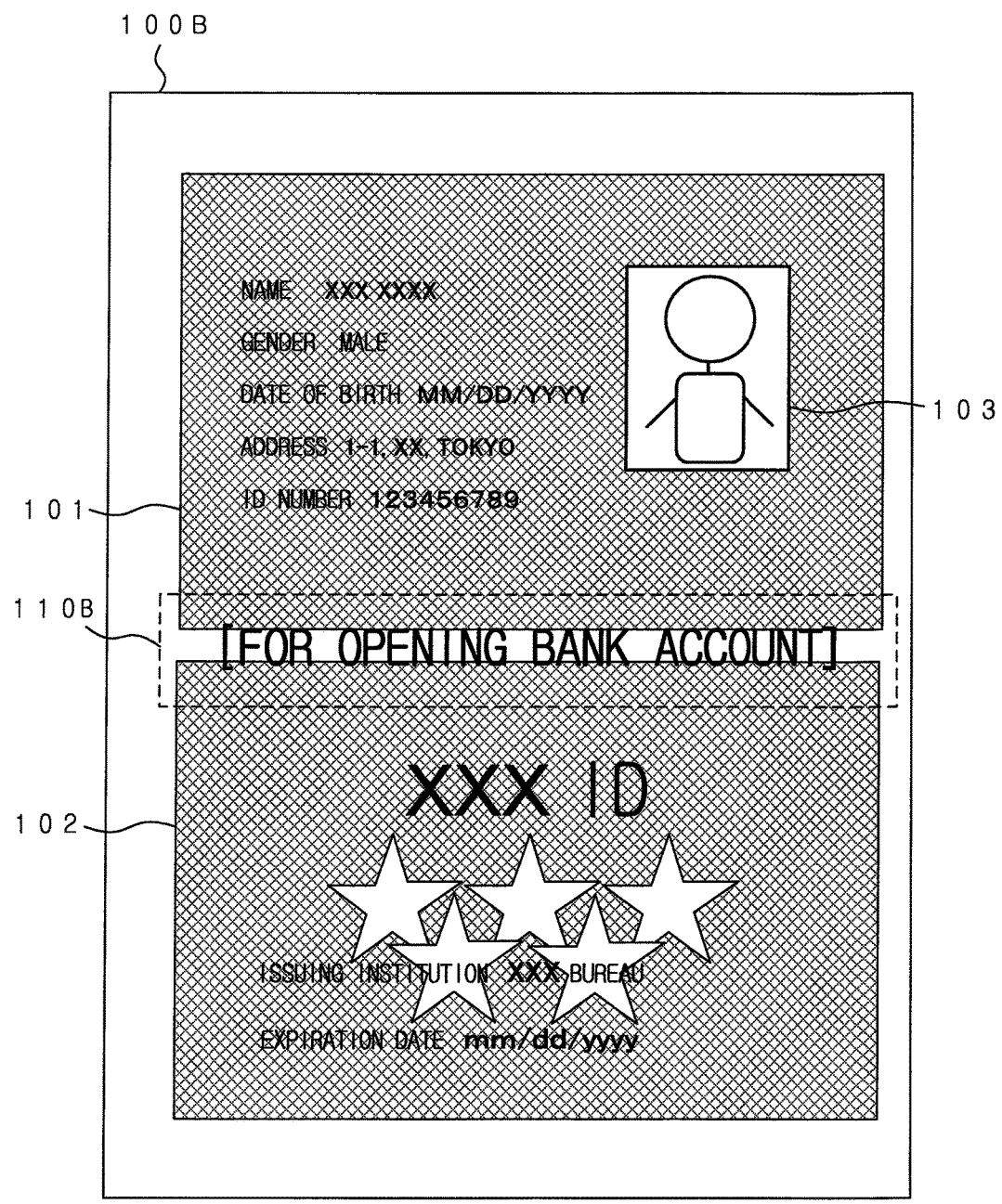
FIG. 4 is a view showing another example of the copy, which is different from that of FIG. 3.

In the copy 100B of FIG. 4, the utilization purpose text 110B is overlapped on both of the lower portion of the front image 101 and the upper portion of the back image 102. In this pattern, because the blank space is arranged between the front image 101 and the back image 102, the utilization purpose text 110B is overlapped so as to spread on the lower portion of the front image 101, the upper portion of the back image 102 and the blank space between the lower portion of the front image 101 and the upper portion of the back image 102.

<Arrangement Pattern 3>

Figure 5:
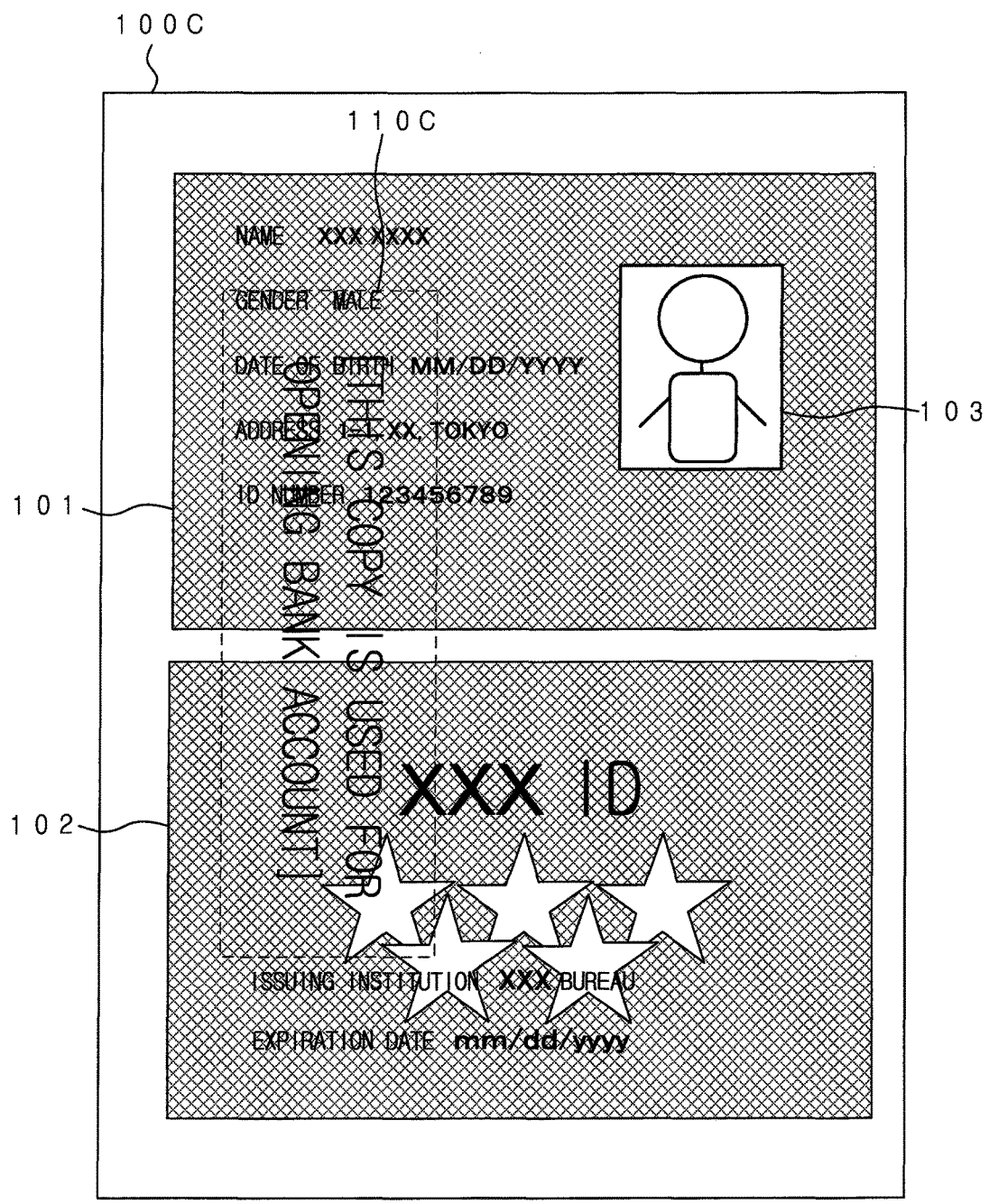
FIG. 5 is a view showing another example of the copy, which is different from those of FIGS. 3 and 4.

In the copy 100C of FIG. 5, the utilization purpose text 110C is overlapped on both of the left portion of the front image 101 and the left portion of the back image 102. Because the blank space is arranged between the front image 101 and the back image 102 similarly to FIG. 4, the utilization purpose text 110C is overlapped so as to spread on the left portion of the front image 101, the left portion of the back image 102 and the blank space between the lower left portion of the front image 101 and the upper left portion of the back image 102. In this pattern, the characters described in the image of the identification card are overlapped with the utilization purpose text 110C. However, because the utilization purpose text 110C is lightly printed, the characters and the utilization purpose text 110C can be visually recognized. Because the characters described in the image and the text indicating the utilization purpose can be visually recognized even though the text is overlapped with the characters, it is possible to largely print the text indicating the utilization purpose. Further, by overlapping the text with the characters described in the image, it is possible to make it difficult to cut off the text indicating the utilization purpose.

<Arrangement Pattern 4>

Figure 6:
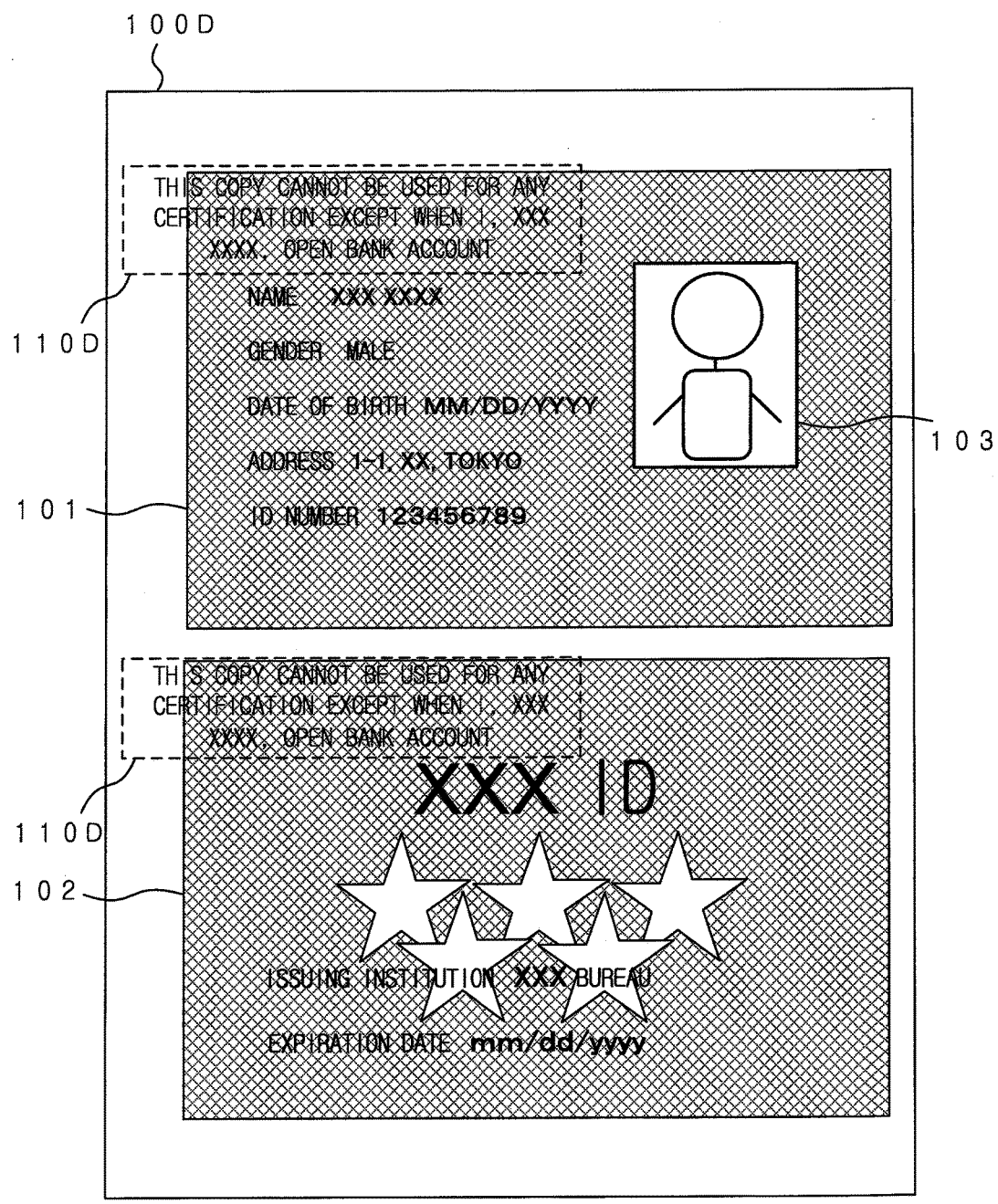
FIG. 6 is a view showing another example of the copy, which is different from those of FIGS. 3, 4 and 5.

In the copy 100D of FIG. 6, the utilization purpose texts 110D having the same contents are overlapped (synthesized) on the upper left portion of the front image 101 and the upper left portion of the back image 102, respectively. Each of the two utilization purpose texts 110D spreads on the blank space of the copy 100D, which is positioned on the left side of each image (the front image 101 and the back image 102).

Next, the contents of the utilization purpose and the method for entering the utilization purpose will be explained. The utilization purpose of the copy includes the opening of the bank account, the use of the hotel, the buy of the ticket, and the like.

The method for entering the utilization purpose includes the method for selecting one utilization purpose among the predetermined utilization purposes, and the method for entering an optional purpose by using a keyboard or by entering the purpose in handwriting. The user can select one method for entering the utilization purpose between the above methods.

Figure 7:
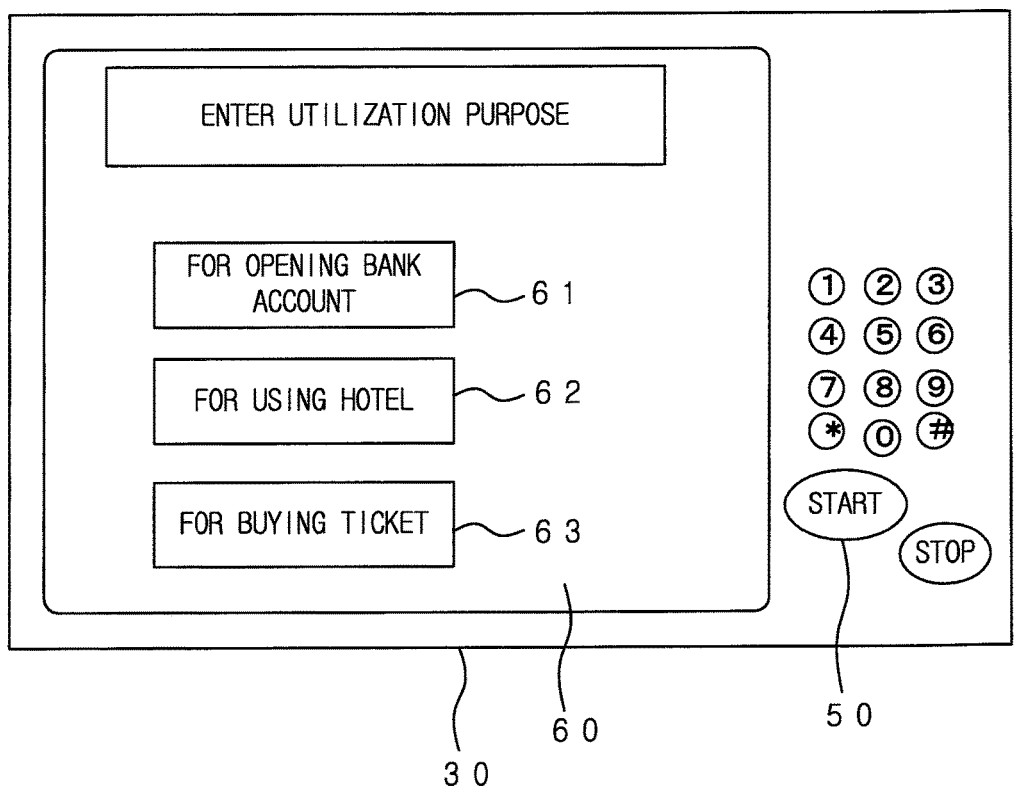
FIG. 7 is a view showing an example of the window for selecting the utilization purpose.
Figure 8:
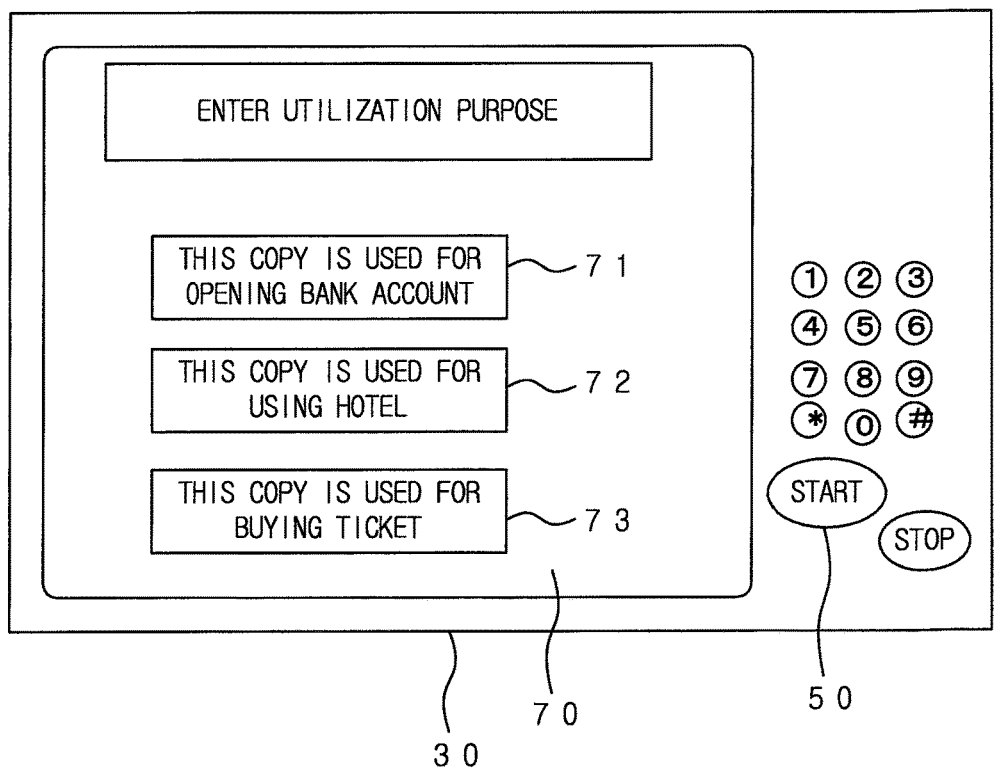
FIG. 8 is a view showing another example of the window, which is different from that of FIG. 7.
Figure 9:
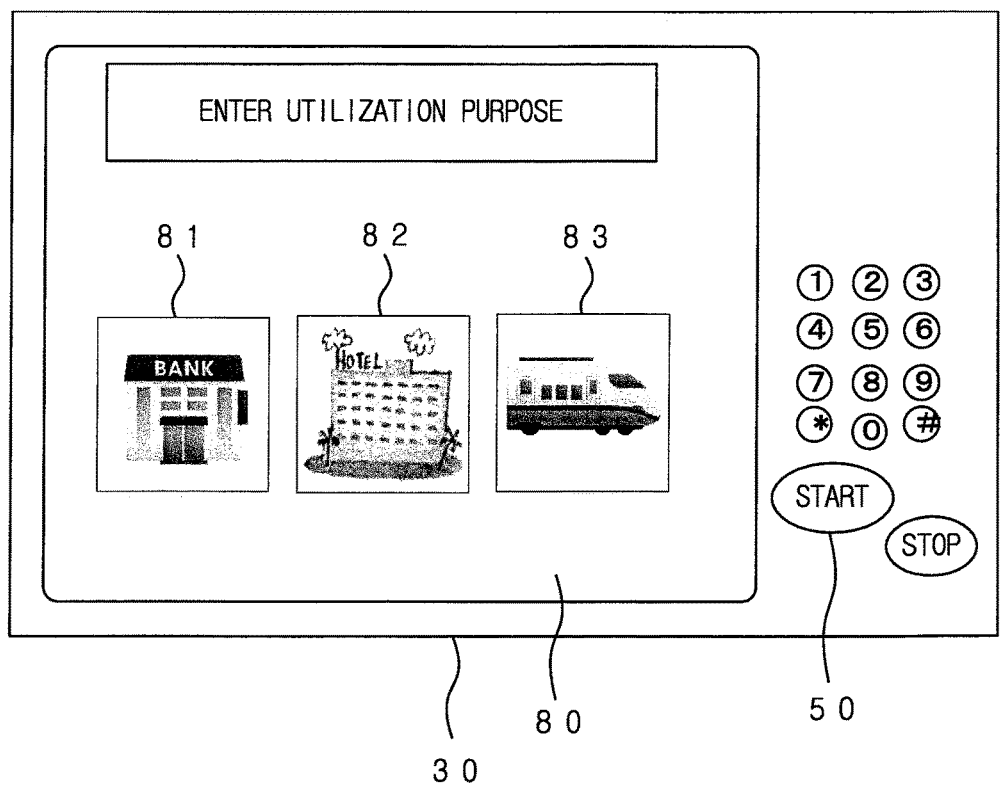
FIG. 9 is a view showing another example of the window, which is different from those of FIGS. 7 and 8.

FIGS. 7 to 9 show various types of selection windows (60, 70 and 80) displayed on the operation panel 30 in case that the user enters the utilization purpose by using the method for selecting one option among the options indicating the utilization purposes which are displayed on the operation panel 30 (the method for selecting one utilization purpose among the predetermined utilization purposes). That is, the operation panel 30 receives the entry of the utilization purpose by receiving the selection of one option among a plurality of options.

<Option Indicating Simple Contents>

In the selection window 60 of FIG. 7, the option buttons 61 to 63 indicating the utilization purposes, are displayed. In the option button 61, the term "for opening bank account" is displayed. In the option button 62, the term "for using hotel" is displayed. In the option button 63, the term "for buying ticket" is displayed. The contents displayed in the option buttons 61 to 63 simply indicate the contents of the text to be actually printed by overlapping the text with the image of the identification card. When the user presses (selects) any one of the option buttons 61 to 63 and then presses the start button 50, the image forming apparatus 10 starts to print the copy in which the text indicating the utilization purpose corresponding to the pressed option button (61 to 63) is overlapped with the image of the identification card.

<Option Indicating the Text to be Actually Printed>

In the selection window 70 of FIG. 8, the option buttons 71 to 73 indicating the utilization purposes, are displayed. In the option button 71, the text "This copy is used for opening bank account" is displayed. In the option button 72, the text "This copy is used for using hotel" is displayed. In the option button 73, the text "This copy is used for buying ticket" is displayed. The contents displayed in the option buttons 71 to 73 are the contents of the text to be actually printed by overlapping the text with the image of the identification card. Similarly to FIG. 6, when the user presses (selects) any one of the option buttons 71 to 73 and then presses the start button 50, the image forming apparatus 10 starts to print the copy in which the text indicating the utilization purpose corresponding to the pressed option button (71 to 73) is overlapped with the image of the identification card.

<Option Indicated by Icon>

In the selection window 80 of FIG. 9, the option buttons 81 to 83 indicating the utilization purposes, are displayed. Each of the option buttons 81 to 83 is an icon indicating the contents of the utilization purpose. The option button 81 is an icon in which a bank is illustrated, and indicates that the utilization purpose is the opening of the bank account. The option button 82 is an icon in which a hotel is illustrated, and indicates that the utilization purpose is the use of the hotel. The option button 83 is an icon in which a train is illustrated, and indicates that the utilization purpose is the buy of the ticket. Similarly to FIG. 6, when the user presses (selects) any one of the option buttons 81 to 83 and then presses the start button 50, the image forming apparatus 10 starts to print the copy in which the text indicating the utilization purpose corresponding to the pressed option button (81 to 83) is overlapped with the image of the identification card.

Figure 10:
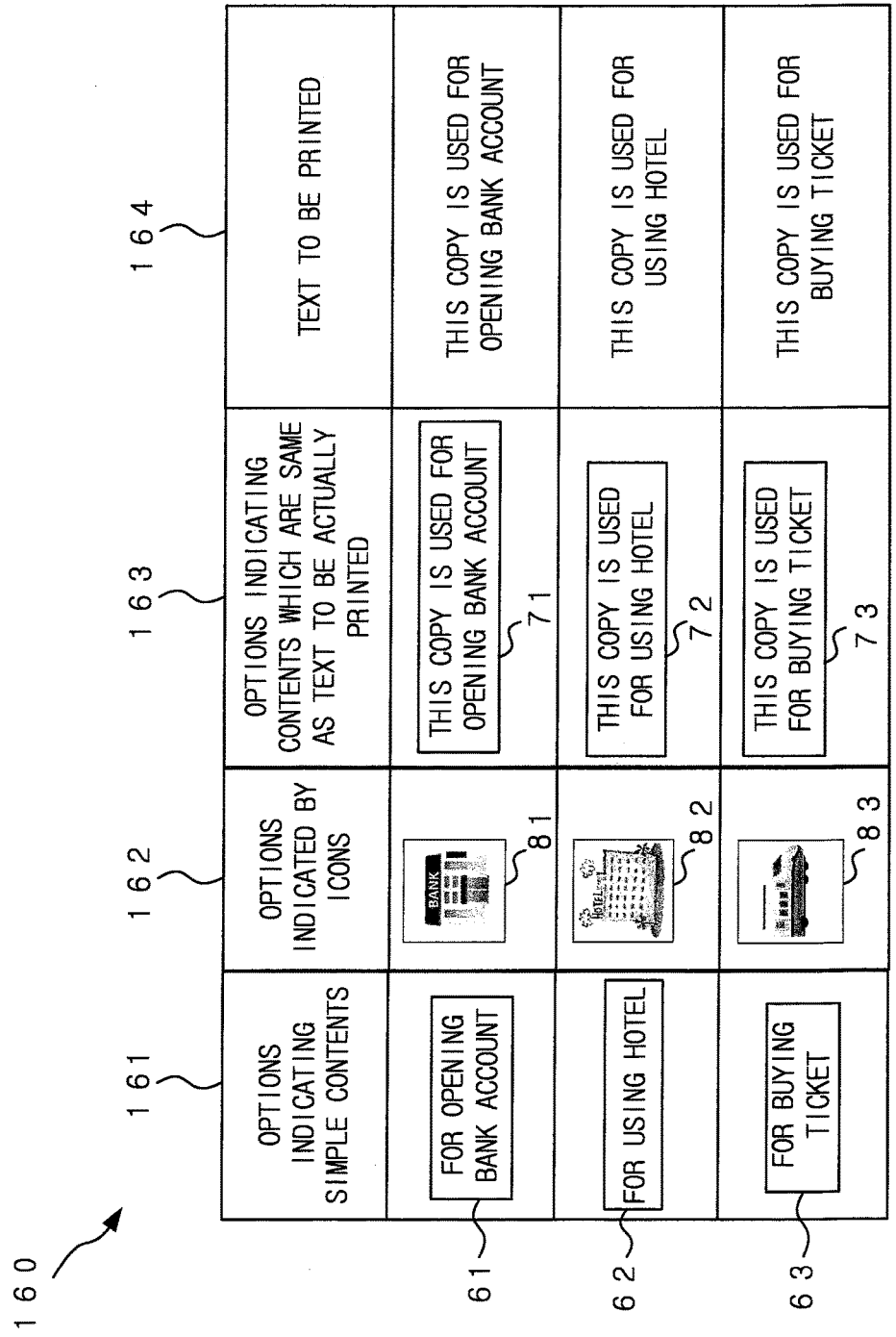
FIG. 10 is a view showing the print text reference table in which the text to be printed is registered for each option relating to the utilization purpose.

FIG. 10 shows the print text reference table 160. In the print text reference table 160, the option buttons (61 to 63, 71 to 73 and 81 to 83) which are displayed on each of the selection windows (60, 70 and 80) shown in FIGS. 7 to 9, are registered. Further, in the print text reference table 160, each text indicating the utilization purpose, which is actually printed by overlapping the text with the image of the identification card when any one of the option buttons (61 to 63, 71 to 73 and 81 to 83) is selected, is registered.

The print text reference table 160 includes the column 161 for the options indicating the simple contents, the column 162 for the options indicated by the icons, the column 163 for the options indicating the contents which are actually printed, and the column 164 for the texts to be printed.

In the column 161, the option buttons 61 to 63 to be displayed in the selection window 60 are registered. In the column 162, the option buttons 81 to 83 to be displayed in the selection window 80 are registered. In the column 163, the option buttons 71 to 73 to be displayed in the selection window 70 are registered. In the column 164, each text indicating the utilization purpose, which is actually printed in case that any one of the option buttons (61 to 63, 71 to 73 and 81 to 83) is selected, is registered.

In case that the image of the identification card is printed after any one of the option button 61, the option button 81 and the option button 71 is selected, the text "This copy is used for opening bank account" is printed on the copy as the text indicating the utilization purpose.

In case that the image of the identification card is printed after any one of the option button 62, the option button 82 and the option button 72 is selected, the text "This copy is used for using hotel" is printed on the copy as the text indicating the utilization purpose.

In case that the image of the identification card is printed after any one of the option button 63, the option button 83 and the option button 73 is selected, the text "This copy is used for buying ticket" is printed on the copy as the text indicating the utilization purpose.

One option indicating the utilization purpose may be selected among a plurality of options by using an external device. In this case, the network communication unit 20 receives the entry of the utilization purpose by receiving the above selection via the network.

Figure 11:
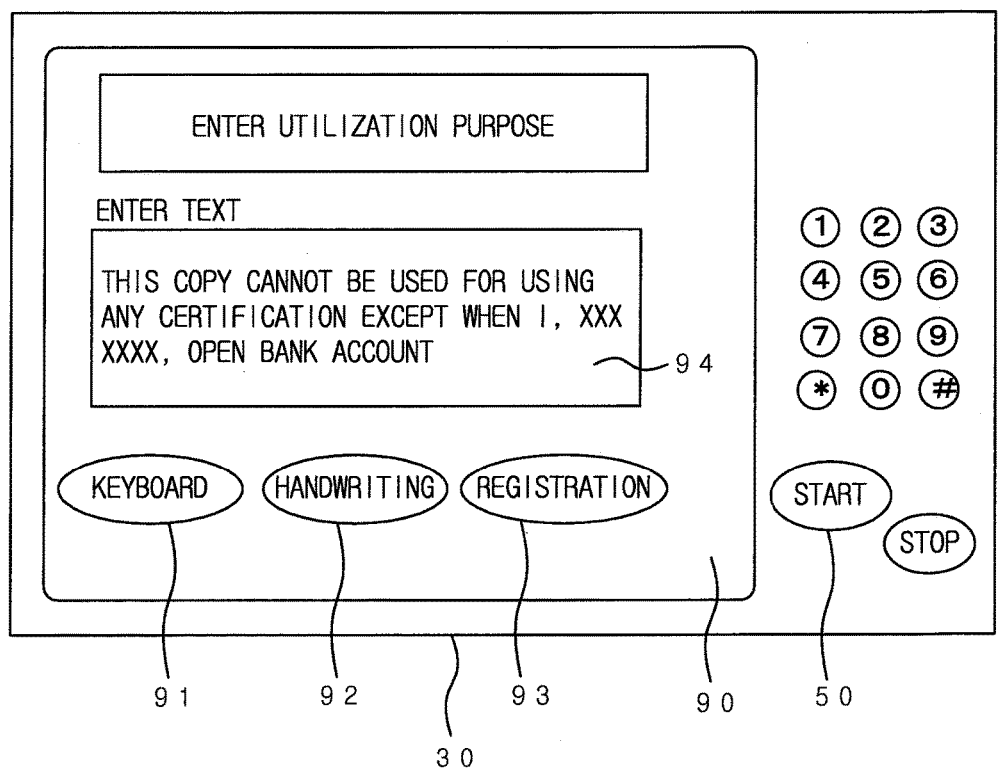
FIG. 11 is a view showing an example of the window for entering the utilization purpose.

FIG. 11 shows the entry window 90 which is displayed on the operation panel 30 in case that the utilization purpose is entered by using the keyboard or by handwriting the utilization purpose in the operation panel 30. That is, the operation panel 30 receives the entry of the utilization purpose by using the keyboard or by entering the utilization purpose in handwriting.

In the text box 94 for entering the text in the entry window 90, the text which is entered by using the keyboard or by handwriting the utilization purpose is displayed. When the keyboard entry window changing button 91 is pressed, the image forming apparatus 10 changes the entry window 90 to the window to be used for carrying out the keyboard entry. The user carries out the keyboard entry by using the changed window to enter the text indicating the utilization purpose. The keyboard entry may be carried out by using the keyboard which is displayed on the operation panel 30, or by transmitting the contents entered by using an external keyboard, to the image forming apparatus 10. The entry of the utilization purpose, which is carried out by using an external keyboard, is received by the network communication unit 20 via the network. When the entry of the utilization purpose is finished, the window automatically returns to the entry window 90.

When the handwriting entry window changing button 92 is pressed, the image forming apparatus 10 changes the entry window 90 to the window to be used for carrying out the handwriting entry. The user carries out the handwriting entry for the changed window to enter the text indicating the utilization purpose. The handwriting entry may be carried out by entering the text to the operation panel 30, or by transmitting the contents entered by using an external device (a pen tablet or the like), to the image forming apparatus 10. The handwriting entry of the utilization purpose, which is carried out by using an external device, is received by the network communication unit 20 via the network. When the entry of the utilization purpose is finished, the window automatically returns to the entry window 90.

When the contents which are entered by one method of the keyboard entry and the handwriting entry are displayed in the text box 94, in case that a new utilization purpose is entered by the other method, the contents which have been displayed in the text box 94 are reset. Then, the contents which are newly entered are displayed.

When the registration button 93 is pressed, the text displayed in the text box 94 is stored. The stored text can be used by reading out the stored text when the utilization purpose is entered next time.

When the start button 50 is pressed, the image forming apparatus 10 starts to print the copy by overlapping the contents displayed in the text box 94 (the text indicating the utilization purpose) with the image of the identification card.

Next, the method for judging whether the original (document to be copied) is an identification card, by the original judging unit 22 in case that the image forming apparatus 10 executes a copy job, will be explained. As the method for judging the original, two methods are proposed. In the first method (user selection), the original is judged by receiving the designation in which the original (document to be copied) is an identification card, from the user. In the second method (automatic judgment), the read image is analyzed to obtain the arrangement information relating to the arrangement of each element, such as the picture portion, the text and the like in the image, and the arrangement information is compared with the fixed forms received from the server 40.

Figure 12:
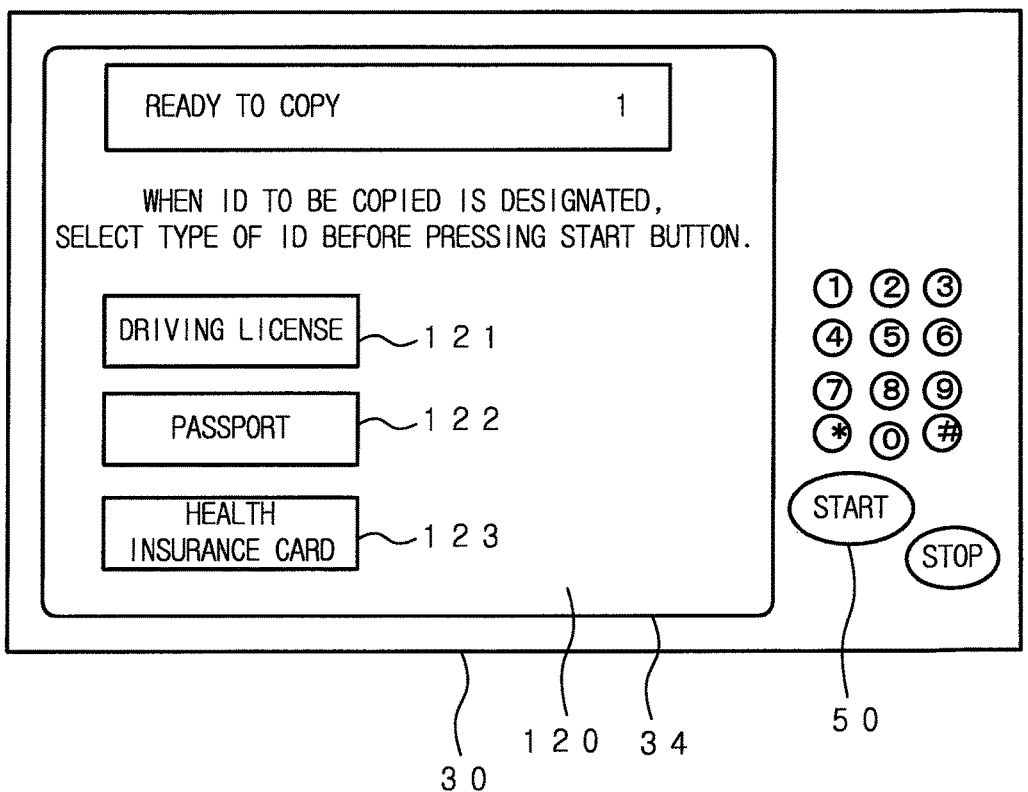
FIG. 12 is a view showing an example of the window for selecting the type of identification card.

FIG. 12 shows the original designation window 120 which is displayed on the operation panel 30 just before the instruction for starting to execute a copy job is received (in the state in which the document to be copied is set to the ADF or on the platen glass). In case that the instruction for starting to execute a copy job is received (the start button 50 is pressed) in the state in which any one of the original designation buttons 121 to 123 in the original designation window 120 is selected, the original judging unit 22 judges the original as the identification card corresponding to the selected original designation button (121 to 123). That is, the original judging unit 22 judges the obtained image which is obtained by the scanner unit 17 or the like, as the image of the identification card by receiving the designation in which the obtained image is the image of the identification card, through the operation panel 30.

In case that the original designation button 121 is selected when the start button 50 is pressed, the original judging unit 22 recognizes the document to be copied as the driving license. In case that the original designation button 122 is selected when the start button 50 is pressed, the original judging unit 22 recognizes the document to be copied as the passport. In case that the original designation button 123 is selected when the start button 50 is pressed, the original judging unit 22 recognizes the document to be copied as the health insurance card.

When the start button 50 is pressed in the state in which any of the original designation buttons 121 to 123 is not selected, the original judging unit 22 judges whether the document to be copied is an identification card by the second method (automatic judgment). That is, the original judging unit 22 judges whether the obtained image which is obtained by the scanner unit 17 or the like is the image of the identification card, by analyzing the obtained image. In case that the document to be copied is the identification card, the original judging unit 22 judges the type of identification card.

When the judgment which is carried out in accordance with the second method is started, the image forming apparatus 10 accesses to the server 40 to obtain the information relating to a plurality of fixed forms. Next, the original judging unit 22 analyzes the image which is obtained by reading the original with the scanner unit 17, and obtains the arrange information relating to the arrangement of each element, such as the text, the picture portion and the like. Then, the original judging unit 22 extracts the fixed form having the arrangement information (arrangement pattern) which is matched with the obtained arrangement information.

In case that there is no fixed form which is matched with the obtained arrangement information, the original judging unit 22 judges that the document to be copied is not the identification card. In case that there is a fixed form which is matched with the obtained arrangement information (in case that the fixed form which is matched with the obtained arrangement information is extracted), the original judging unit 22 judges the original as the identification card corresponding to the matched fixed form. Therefore, it is judged whether the document to be copied is the identification card. Further, in case of the identification card, the type of identification card is judged.

Figure 13:
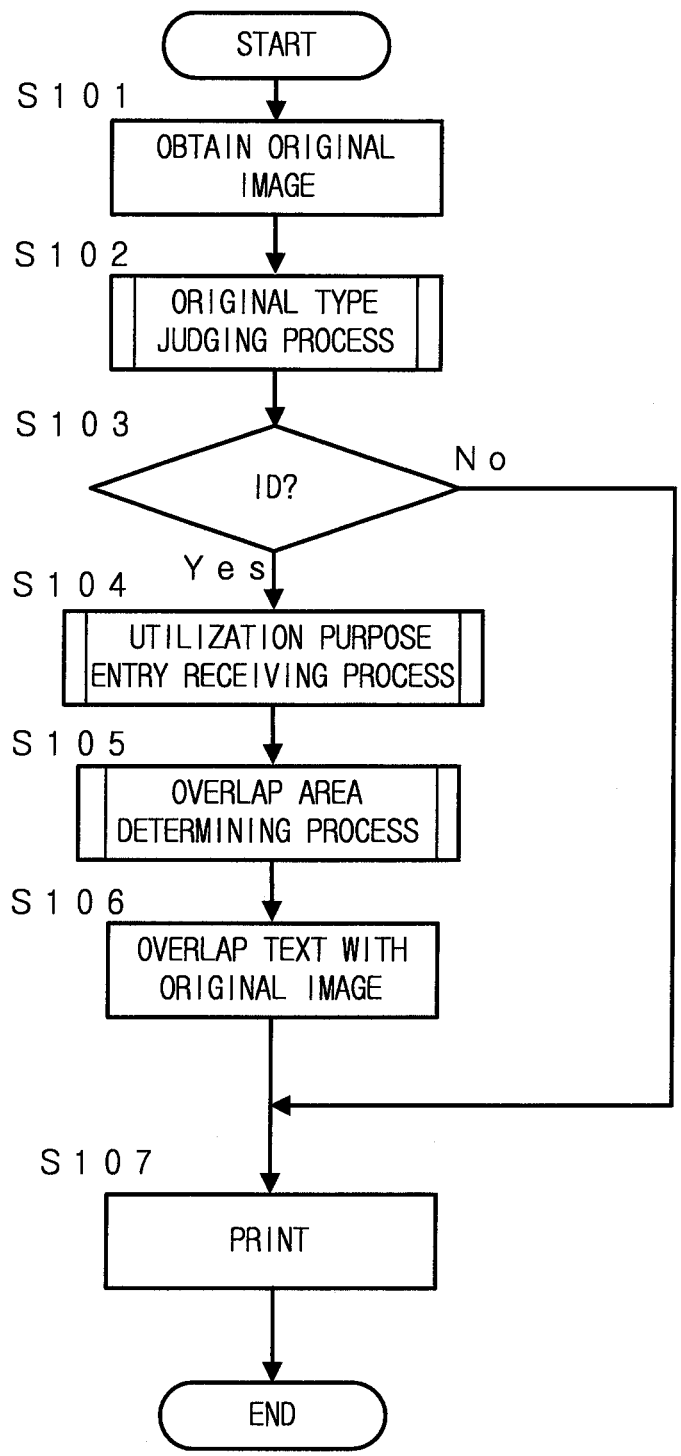
FIG. 13 is a flowchart showing the outline of the process for printing the copy, which is carried out by the image forming apparatus according to the embodiment.

Next, various types of processes which are carried out by the image forming apparatus 10, will be explained. FIG. 13 shows the outline of the process which is carried out when a copy job is executed by the image forming apparatus 10.

When a copy job is started, the scanner unit 17 reads the original and obtains the image of the original (Step S101). The method for reading the face of the original includes one-side, two-side and spread. The scanner unit 17 reads the original in accordance with the type of original. Next, the original type judging process for judging whether the original (the document to be copied) is an identification card, is carried out (Step S102).

In case that it is judged that the original (the document to be copied) read in Step S101 is not an identification card in Step S102 (Step S103; No), the image of the original is normally printed in Step S107. That is, in this case, a normal copy job for copying a normal original is executed.

In case that it is judged that the original (the document to be copied) read in Step S101 is an identification card in Step S102 (Step S103; Yes), the operation panel 30 receives the entry of the utilization purpose in the utilization purpose entry receiving process (Step S104).

Next, the overlap area determining process for determining the position on which the text indicating the utilization purpose received in Step S104 is overlapped in the image to be copied, is carried out (Step S105).

Then, the CPU 11 generates the overlapped image in which the text indicating the utilization purpose is overlapped on the position determined in Step S105 (Step S106), and instructs the printer unit 18 to print the overlapped image (Step S107). Then, the process is ended. That is, only in case that the original judging unit 22 judges that the image read in Step S101 is the image of the identification card, the CPU 11 overlaps the text indicating the utilization purpose received by the operation panel 30 or the like with the read image, and instructs the printer unit 18 to print the overlapped text and the image of the identification card.

Figure 14:
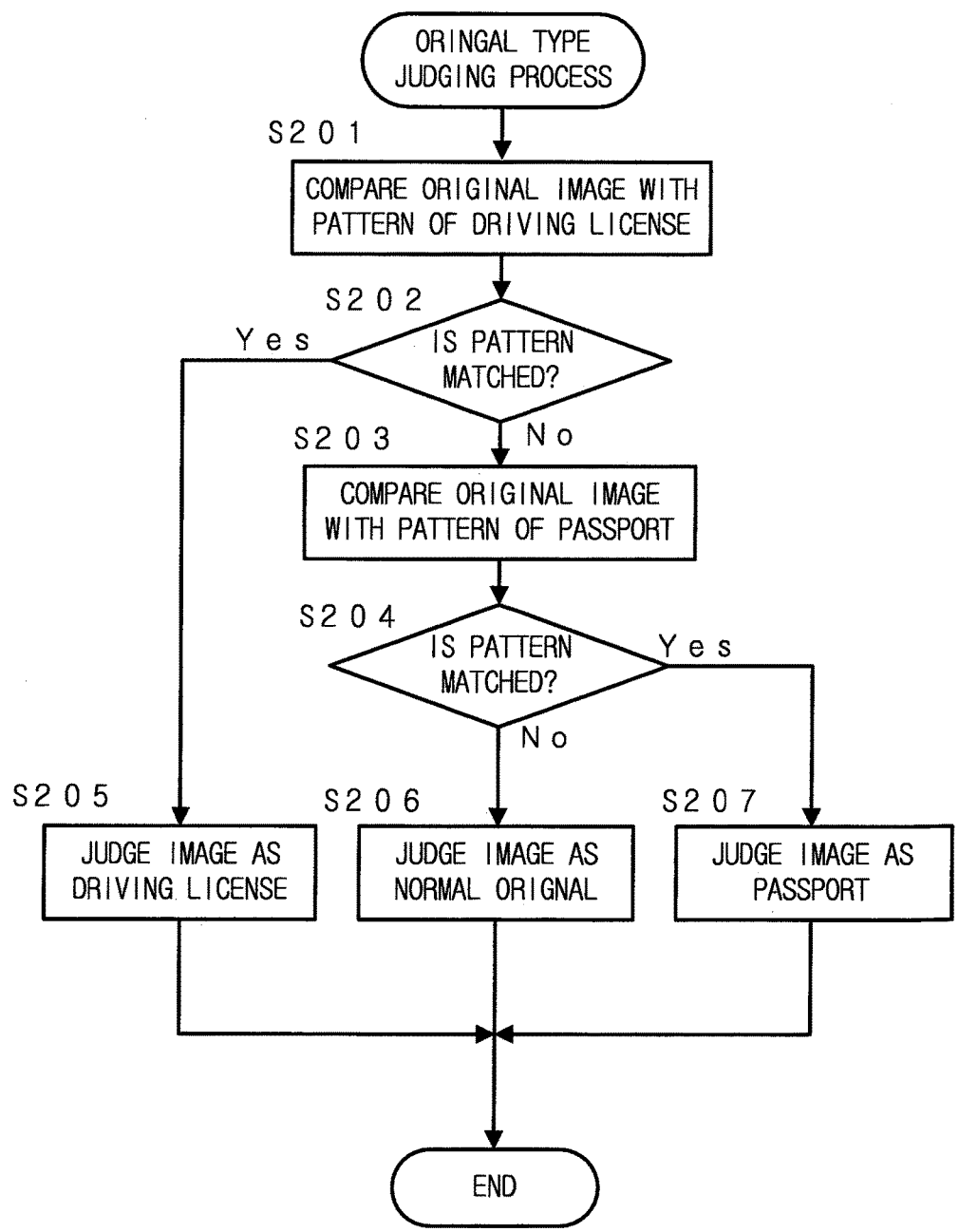
FIG. 14 is a flowchart showing the process for judging the type of identification card from the read image.

FIG. 14 shows the original type judging process which is carried out in Step S102 of FIG. 13. FIG. 14 shows not the process in which the user designates the type of original (See FIG. 12), but the process in which the original judging unit 22 of the image forming apparatus 10 automatically judges the type of original (the document to be copied).

Firstly, the original judging unit 22 obtains the fixed forms of the driving license and the passport from the server 40, and obtains the arrangement information relating to the arrangement of each element by analyzing the image obtained in Step S101 of FIG. 13. Then, the original judging unit 22 compares the obtained arrangement information with the fixed form of the driving license (Step S201).

In case that the arrangement information which is indicated in the fixed form of the driving license is matched with the arrangement information obtained by analyzing the image (Step S202; Yes), the original judging unit 22 judges that the original is the driving license (Step S205). Then, the process is ended.

In case that the arrangement information which is indicated in the fixed form of the driving license is not matched with the arrangement information obtained by analyzing the image (Step S202; No), the original judging unit 22 compares the arrangement information obtained by analyzing the image with the fixed form of the passport (Step S203).

In case that the arrangement information which is indicated in the fixed form of the passport is matched with the arrangement information obtained by analyzing the image (Step S204; Yes), the original judging unit 22 judges that the original is the passport (Step S207). Then, the process is ended.

In case that the arrangement information which is indicated in the fixed form of the passport is not matched with the arrangement information obtained by analyzing the image (Step S204; No), the original judging unit 22 judges that the original is a normal original which is not an identification card (Step S206). Then, the process is ended.

Figure 15:
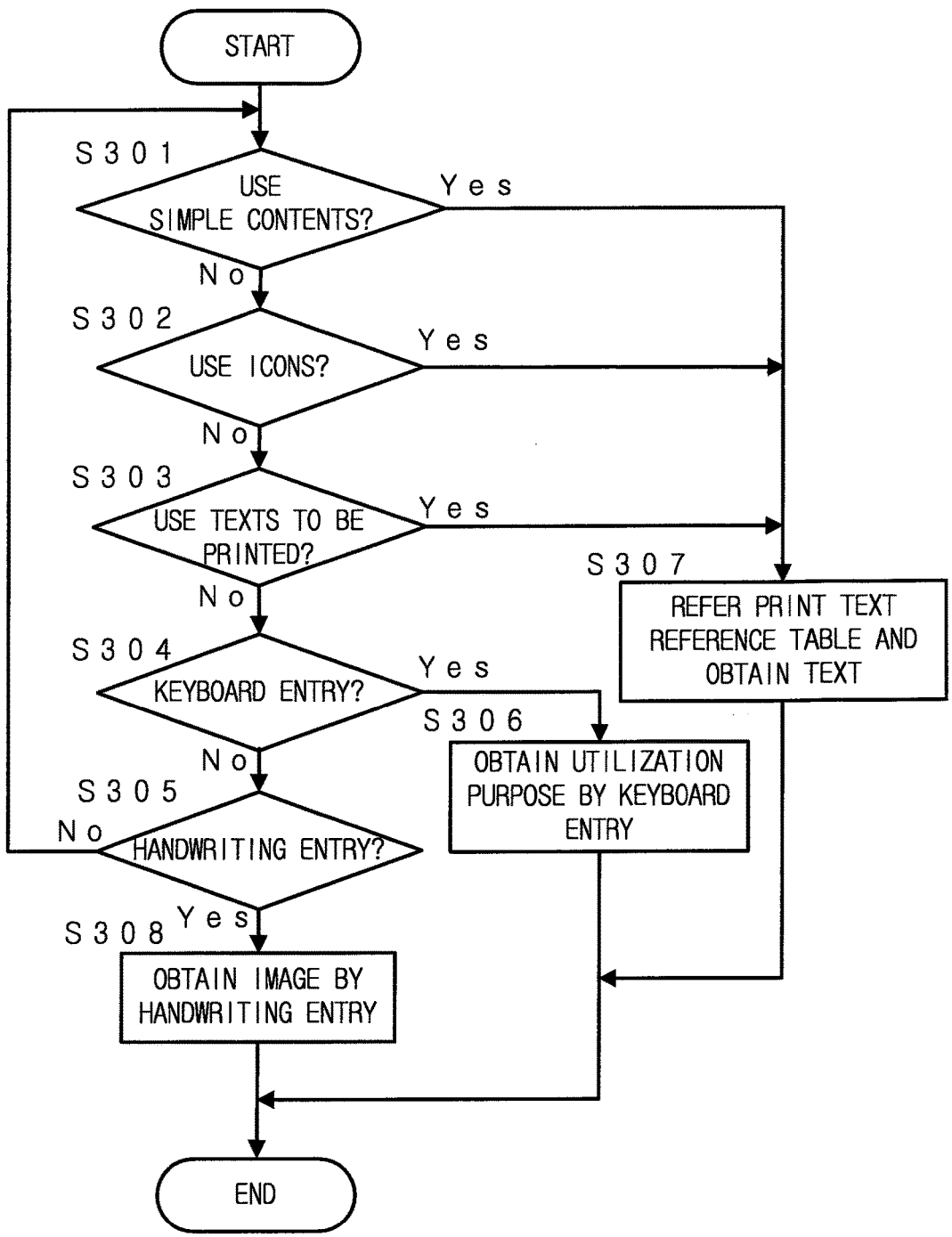
FIG. 15 is a flowchart showing the process for receiving the selection or the entry of the utilization purpose and for determining the text indicating the utilization purpose to be printed.

FIG. 15 shows the utilization purpose entry receiving process which is carried out in Step S104 of FIG. 13. The image forming apparatus 10 monitors the operation which is received from the user. When the operation panel 30 receives the selection of the method in which the option indicating the simple contents of the text to be actually printed is selected (Step S301; Yes), the process proceeds to Step S307.

When the operation panel 30 receives the selection of the method in which the option indicated by the icon is selected (Step S301; No and Step S302; Yes), the process proceeds to Step S307.

When the operation panel 30 receives the selection of the method in which the option indicating the contents of the text to be actually printed is selected (Step S302; No and Step S303; Yes), the process proceeds to Step S307.

In Step S307, the CPU 11 refers the print text reference table 160 shown in FIG. 10, and obtains the text corresponding to the selected option (text to be actually printed). Then, the process is ended.

When the keyboard entry is selected, that is, when the keyboard entry window changing button 91 (See FIG. 11) is pressed (Step S303; No and Step S304; Yes), the operation panel 30 receives the entry of the utilization purpose (the text indicating the utilization purpose) by using the keyboard in the changed window (Step S306). Then, the process is ended.

When the handwriting entry is selected, that is, when the handwriting entry window changing button 92 (See FIG. 11) is pressed (Step S304; No and Step S305; Yes), the operation panel 30 receives the handwriting entry of the utilization purpose in the changed window. The CPU 11 obtains the received image as the text indicating the utilization purpose (Step S308). Then, the process is ended.

The process between Step S301 and Step S305 is a looped process in which the CPU 11 waits the reception of the operation for selecting one method for entering the utilization purpose among the selection of the option, the keyboard entry and the handwriting entry.

Figure 16:
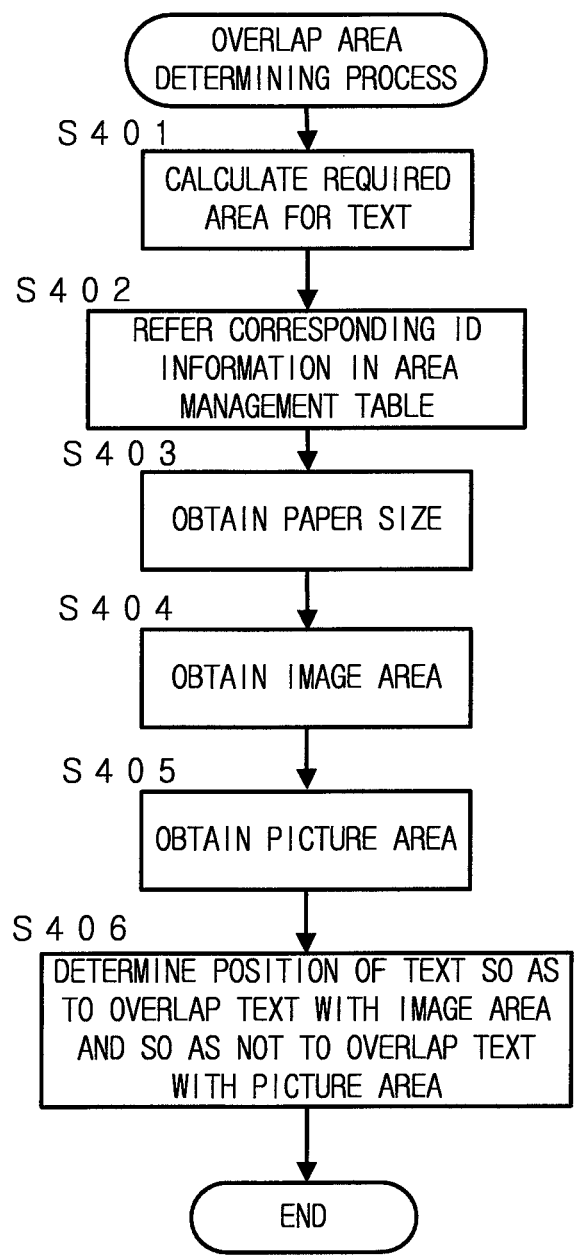
FIG. 16 is a flowchart showing the process for determining the position on which the text indicating the utilization purpose is printed, so as to adjust the position of the text to the image of the identification card.
Figure 18:
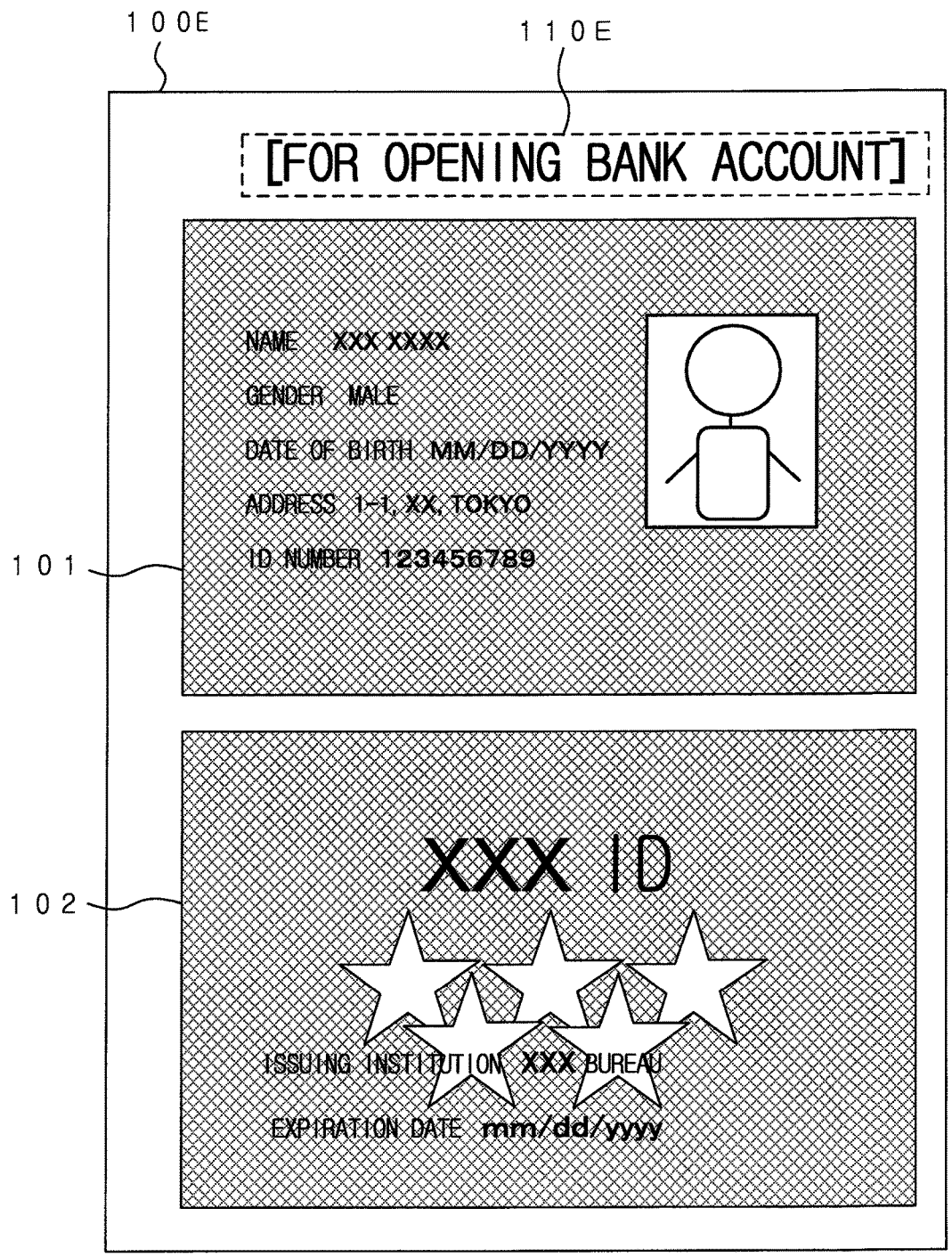
FIG. 18 is a view showing an example of the case in which the text indicating the utilization purpose is printed apart from the image of the identification card.

FIG. 16 shows the overlap area determining area which is carried out in Step S105 of FIG. 13. By the process, the CPU 11 determines the position on which the text obtained in the utilization purpose entry receiving process of FIG. 15 is overlapped (synthesized) with the image obtained in Step S101 of FIG. 13.

Firstly, in case that the text obtained in the utilization purpose entry receiving process of FIG. 15 is overlapped, the CPU 11 calculates the size (area) of the text to be overlapped (Step S401). For example, the size is calculated in accordance with the number of the characters in the text, the number of lines of the text, and the like. In this embodiment, in case of the handwriting entry, the above size is predetermined.

The CPU 11 of the image forming apparatus 10 checks the arrangement position of the image and the like of the identification card (layout) in the paper in accordance with the fixed form obtained from the server 40, and determines the position on which the text indicating the utilization purpose is overlapped.

FIG. 17 shows an example of the area management table 150 indicating the layout in each identification card to be copied. The area management table 150 includes an original type column 151, a paper size column 152, a print side column 153, an image area column 154, a picture image column 155 and a picture area column 156.

In the original type column 151, the types of identification cards are registered. In the paper size column 152, the size of paper which is used for copying the identification card is registered. In this embodiment, only one type of paper size is registered. However, another paper size may be registered. In the print side column 153, as the copied face of the identification card, one of the one-side, the two-side (front/back) and the spread is registered for each identification card.

In the image area column 154, each area in which the image of the identification card is printed on the paper having the paper size shown in the paper size column 152, is registered as the coordinate information. The picture image column 155 indicates whether the picture portion is provided in the identification card registered in the original type column 151. In the picture area column 156, in case that the picture portion is provided, the area in which the picture portion is printed on the paper having the paper size shown in the paper size column 152, is registered as the coordinate information.

The explanation of the overlap area determining process is continued with reference to FIG. 16. Next, the CPU 11 refers the information relating to the identification card which is judged in the original type judging process of FIG. 13, by using the area management table 150 (Step S402).

The CPU 11 obtains the information indicating the size of the paper which is used for printing the image of the identification card (the area information of the paper) (Step S403). The CPU 11 obtains the information of the area in which the image of the identification card is printed (Step S404). Then, in case that the picture portion is provided in the identification card, the CPU 11 obtains the information of the area in which the picture portion is printed (Step S405).

Then, the CPU 11 determines the position of the text to be overlapped, so as to satisfy the size of the text, which is calculated in Step S401, and so as not to overlap the text with the picture portion (Step S406). Then, the CPU 11 overlaps the text with the image of the identification card so as to avoid the text from being overlapped with the picture portion which is one of the predetermined elements, in accordance with the arrangement pattern corresponding to the type of identification card, which is judged by the original judging unit 22.

Alternatively, the position on which the text is overlapped (the area in which the text is synthesized with the image) and the size (area) of the text to be overlapped may be predetermined for each arrangement pattern (See FIGS. 3 to 6) with respect to each type of identification card. Then, the size of the characters of the text (in case of the handwriting entry, the size of the handwritten image) may be adjusted so as to fit in the above predetermined area.

In this embodiment, when a copy job is executed, the original judging unit 22 judges whether the document to be copied is an identification card. In case that the document to be copied is an identification card, the operation panel 30 receives the entry of the utilization purpose of the copy. Further, the CPU 11 overlaps the text indicating the received utilization purpose with the image of the identification card and instructs the printer unit 18 to print the overlapped text and the image of the identification card. In case that the identification card is copied, because the image of the identification card (copied image) and the text indicating the utilization purpose are printed so as to be unable to cut off the text from the image of the identification card, it is possible to prevent the diversion of the copy for purpose except the printed utilization purpose.

Further, when the text indicating the utilization purpose is overlapped with the copied image, the CPU 11 overlaps the text so as to avoid the text from being overlapped with the picture portion in the image of the identification card. Therefore, it is possible to visually recognize the picture portion in the copy of the identification card. The CPU 11 may overlap the text with the image of the identification card so as to avoid the text from being overlapped with the predetermined element except the picture portion, such as the registration number of the identification card, the specific text or the like.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In the embodiment, the image obtained by reading the original with the scanner unit 17 is printed. However, the method for obtaining the image is not limited to this. For example, the network communication unit 20 may receive the image of the identification card from an external device, such as the server 40 or the like. In this case, the original judging unit 22 judges whether the received image is the image of the identification card.

In the embodiment, the operation panel 30 receives the entry of the utilization purpose. However, the reception of the entry of the utilization purpose is not limited to this. For example, as the utilization purpose entry receiving unit, the network communication unit 20 may receive the entry of the utilization purpose from an external device via the network.

In the embodiment, in case that the image obtained by reading the original with the scanner unit 17 is analyzed, the original judging unit 22 checks the arrangement information relating to the arrangement of each element in the image by using the fixed form and judges whether the obtained image is the image of the identification card. However, in case that a specific mark, a specific text or the like is detected in the image by analyzing the image, the original judging unit 22 may judge that the obtained image is the image of the identification card. Similarly, in case that the type of identification card is judged, the type of identification card may be judged by detecting a specific mark, a specific text or the like in the image.

In the embodiment, the fixed forms are received from the server 40. However, the fixed forms may be stored in the image forming apparatus 10. In this case, the fixed form (the arrangement pattern of each element in the image of the identification card) is previously registered with respect to each type of identification card in the hard disk drive 15 which is the storing unit.

In the embodiment, the identification card is a driving license, a passport or a health insurance card. The identification card is not limited to these. The identification card may be ones which are used for identifying a person when various types of applications are filed. For example, the Basic Resident Registration Card, the resident identification card or the like, may be used as the identification card.

In the embodiment, in any of the arrangement patterns (See FIGS. 3 to 6 and Arrangement Patterns 1 to 4), the utilization purpose text 110 is arranged so as to spread on the blank space of the paper. However, the text is not required to spread on the blank space. That is, the CPU 11 may overlap the text only with the image of the identification card. Further, the utilization purpose text 110 may be arranged so as to overlap the text with the picture portion 103. The utilization purpose text 110 may be overlapped at least with the image of the identification card.

One of the objects of the above embodiment is to provide an image forming apparatus, an image forming method and a tangible computer-readable recording medium, which can prepare the printed document in which the text indicating the utilization purpose is synthesized with the image of the identification card so as to be unable to cut off the text from the image of the identification card.

In the embodiment, the image of the identification card is obtained. In case that the image is printed, the entry of the utilization purpose of the document to be printed is received and the text indicating the received utilization purpose is overlapped with the obtained image. Because the image is printed by overlapping the text indicating the utilization purpose with the image of the identification card, the text cannot be easily cut off from the image of the identification card. It is possible to prevent the diversion of the printed document for purpose except the printed utilization purpose. The image of the identification card is obtained by reading the original with a scanner, by receiving the image data from an external device, or the like.

In the embodiment, it is judged whether the obtained image is the image of the identification card. Then, only in case that the obtained image is judged as the image of the identification card, the judged image is printed by overlapping the text indicating the utilization purpose. In case that it is judged that the obtained image is not the image of the identification card, the image is printed without overlapping the text indicating the utilization purpose. It is possible to carry out both of the normal printing and the printing of the image with which the text indicating the utilization purpose is overlapped. Further, in particular, in case that the above judgment is automatically carried out, when the document to be printed is judged as a copy of a normal original, the normal printing is carried out, and only when the document to be printed is judged as a copy of the identification card, the entry of the utilization purpose is requested. Therefore, the image forming apparatus becomes more convenient.

In the embodiment, the text indicating the utilization purpose is overlapped so as to spread on the blank space of the paper and the image of the identification card. By using the blank space, the image of the identification card with which the text indicating the utilization purpose is synthesized can be easily viewed.

In the embodiment, the text indicating the utilization purpose is overlapped so as to avoid the text from being overlapped with the predetermined element in the image of the identification card. Therefore, it is possible to visually recognize the predetermined element. The predetermined element includes, for example, the picture portion, a specific text, and the like. As a method for avoiding the text from being overlapped with the predetermined element, there is a method in which the image of the identification card is analyzed and the text is avoided from being overlapped with the portion which is judged as the predetermined element.

In the embodiment, the entry of the utilization purpose is received by selecting one option among a plurality of options indicating the utilization purposes, or by entering the utilization purpose in handwriting. As a format for the options to be displayed, for example, the options are displayed by indicating the contents to be actually printed, by simply indicating the contents to be actually printed, by using icons or the like.

In the embodiment, the first image obtained by the image obtaining unit is judged as the image of the identification card by analyzing the first image or by receiving the designation in which the first image is the image of the identification card, through the utilization purpose entry receiving unit. In the analysis of the first image, for example, by detecting a specific mark or a specific text, it is judged that the first image is the identification card.

In the embodiment, the arrangement of each element in the image of the identification card is analyzed, and the text is overlapped with the image of the identification card so as to avoid the text from being overlapped with the predetermined element.

In the embodiment, the arrangement pattern of each element is stored with respect to each type of identification card. When the type of identification card is judged, the arrangement pattern corresponding to the judged type of identification card is referred. Then, the text indicating the utilization purpose is overlapped with the image of the identification card so as to avoid the text from being overlapped with the predetermined element.

According to the image forming apparatus, the image forming method and the tangible computer-readable recording medium, it is possible to save the troublesome task for adding the utilization purpose in handwriting and to prepare the printed document in which the text indicating the utilization purpose is synthesized with the image of the identification card so as to be unable to cut off the text from the image of the identification card.

The present U.S. patent application claims the priority of Japanese Patent Application No. 2013-27990, filed on Feb. 15, 2013, according to the Paris Convention, and the entirety of which is incorporated herein by reference for correction of incorrect translation.

What is claimed is:

1. An image forming apparatus, comprising:
   an image obtaining unit configured to obtain an image of an identification card, wherein the image obtaining unit comprises at least one of a communication device and a scanner;
   a printer; and
   a processor configured to:
   receive an entry of a utilization purpose of a document to be printed by the printer,
   determine a position of at least one area containing personal information in the image of the identification card,
   synthesize a text indicating the received utilization purpose and the image of the identification card such that the text is overlapped on a part of the image which appears in the area containing the personal information at the determined position, to thereby generate a synthesized image, and
   instruct the printer to print the synthesized image,
   wherein:
   the image obtaining unit obtains, as the image of the identification card, a first image of a front side of the identification card and a second image of a back side of the identification card, and
   the processor is configured to:
   determine the position of said at least one area containing the personal information in at least one of the first image and the second image of the identification card,
   arrange the first image and the second image to be adjacent to each other with a blank space therebetween in a printing area of a page to be printed on a printing medium,
   synthesize the text indicating the received utilization purpose, the first image, the second image, and the blank space, in the printing area of the page to be printed such that the text overlaps the first image, the second image, and the blank space, including on the position of the at least one area in the at least one of the first image and the second image of the identification card, to thereby generate the synthesized image, wherein the processor is configured to overlap the text indicating the received utilization purpose on the position of the at least one area such that the personal information which is overlapped with the text is still visible, and
   instruct the printer to print, in the printing area on the printing medium, the synthesized image which includes the first image and the second image with the blank space therebetween along with the overlapped text which is overlapped on the first image, the second image, and the blank space.

2. The image forming apparatus of claim 1, wherein the processor overlaps the text with the image of the identification card such that the text does not overlap a predetermined element in the image of the identification card.

3. The image forming apparatus of claim 2, wherein the processor overlaps the text with the image of the identification card such that the text does not overlap the predetermined element, by analyzing the image of the identification card.

4. The image forming apparatus of claim 2, further comprising:
   a memory configured to previously register an arrangement pattern of each element in the image of the identification card, with respect to each of a plurality of types of identification cards;
   wherein the processor is configured to judge a type of the identification card, the image of which is obtained by the image obtaining unit, and
   wherein the processor overlaps the text with the image of the identification card such that the text does not overlap the predetermined element in accordance with the arrangement pattern corresponding to the judged type.

5. The image forming apparatus of claim 1, wherein the processor receives the entry of the utilization purpose by receiving a selection of one option among a plurality of options, or by receiving the utilization purpose in handwriting input via an input device.

6. The image forming apparatus of claim 1, wherein the image obtaining unit comprises the scanner, and obtains the image of the identification card by optically reading the identification card.

7. The image forming apparatus of claim 1, wherein the image obtaining unit comprises the communication device, wherein the communication device is configured to communicate with an external device, and obtains the image of the identification card from the external device by communicating with the external device.

8. The image forming apparatus of claim 1, wherein the identification card is a certificate selected from a group consisting of a driving license, a passport, a health insurance card, a basic resident registration card and a resident identification card.

9. The image forming apparatus of claim 1,
   wherein the processor displays a plurality of predetermined options of the utilization purpose of the document to be printed by the printer, and receives the entry of the utilization purpose by receiving a selection of one option among the plurality of displayed options.

10. The image forming apparatus of claim 1, wherein the utilization purpose includes an opening of a bank account, a use of a hotel, and a purchase of a ticket.

11. The image forming apparatus of claim 1, wherein the identification card includes a plurality of areas, and the processor overlaps the text so as to be spread on the plurality of areas and instructs the printer to print the overlapped text and the image of the identification card.

12. The image forming apparatus of claim 1, wherein the personal information includes at least one of a text indicating at least one of a name, date of birth, gender, address and ID number and a photograph.

13. The image forming apparatus of claim 12, wherein the overlapped text indicating the utilization purpose and at least one of the text indicating at least one of a name, date of birth, gender, address and ID number and the photograph are printed so as to identify each other.

14. The image forming apparatus of claim 12, wherein a density of the overlapped text indicating the utilization purpose is lower than a density of the text indicating at least one of a name, date of birth, gender, address and ID number.

15. An image forming method for an image forming apparatus comprising a printer, the method comprising:
   obtaining an image of an identification card;
   receiving an entry of a utilization purpose of a document to be printed;
   determining a position of at least one area containing personal information in the image of the identification card;
   synthesizing a text indicating the received utilization purpose and the image of the identification card such that the text is overlapped on a part of the image which appears in the area containing the personal information at the determined position, to thereby generate a synthesized image; and
   printing, with the printer, the synthesized image,
   wherein:
   the obtaining comprises obtaining, as the image of the identification card, a first image of a front side of the identification card and a second image of a back side of the identification card,
   the position of said at least one area containing the personal information is determined in at least one of the first image and the second image of the identification card,
   the method further comprises arranging the first image and the second image to be adjacent to each other with a blank space therebetween in a printing area of a page to be printed on a printing medium,
   the synthesized image is generated by synthesizing the text indicating the received utilization purpose, the first image, the second image, and the blank space, in the printing area of the page to be printed such that the text overlaps the first image, the second image, and the blank space, including on the position of the at least one area in the at least one of the first image and the second image of the identification card, wherein text indicating the received utilization purpose is overlapped on the position of the at least one area such that the personal information which is overlapped with the text is still visible, and
   the printer is instructed to print, in the printing area on the printing medium, the synthesized image which includes the first image and the second image with the blank space therebetween along with the overlapped text which is overlapped on the first image, the second image, and the blank space.

16. The image forming method of claim 15, wherein the text is overlapped with the image of the identification card such that the text does not overlap a predetermined element in the image of the identification card.

17. The image forming method of claim 15, wherein the entry of the utilization purpose is received by receiving a selection of one option among a plurality of options, or by entering the utilization purpose in handwriting.

18. The image forming method of claim 15,
   wherein a plurality of predetermined options of the utilization purpose of the document to be printed by the printer are displayed, and the entry of the utilization purpose is received by receiving a selection of one option among the plurality of displayed options.

19. The image forming method of claim 15, wherein the utilization purpose includes an opening of a bank account, a use of a hotel, and a purchase of a ticket.

20. The image forming method of claim 15, wherein the identification card includes a plurality of areas, and the text is overlapped so as to be spread on the plurality of areas and the printer is instructed to print the overlapped text and the image of the identification card.

21. The image forming method of claim 15, wherein the personal information includes at least one of a text indicating at least one of a name, date of birth, gender, address and ID number and a photograph.

22. The image forming method of claim 21, wherein the overlapped text indicating the utilization purpose and at least one of the text indicating at least one of a name, date of birth, gender, address and ID number and the photograph are printed so as to identify each other.

23. The image forming method of claim 21, wherein a density of the overlapped text indicating the utilization purpose is lower than a density of the text indicating at least one of a name, date of birth, gender, address and ID number.

24. A non-transitory computer-readable recording medium storing a program that is executable by an image forming apparatus comprising a printer, the program being executable by the image forming apparatus to cause the image forming apparatus to execute functions comprising:
   obtaining an image of an identification card;
   receiving an entry of a utilization purpose of a document to be printed;
   determining a position of at least one area containing personal information in the image of the identification card;
   synthesizing a text indicating the received utilization purpose and the image of the identification card such that the text is overlapped on a part of the image which appears in the area containing the personal information at the determined position, to thereby generate a synthesized image; and
   printing, with the printer, the synthesized image,
   wherein:
   the obtaining comprises obtaining, as the image of the identification card, a first image of a front side of the identification card and a second image of a back side of the identification card,
   the position of said at least one area containing the personal information is determined in at least one of the first image and the second image of the identification card,
   the program causes the image forming apparatus to execute a further function comprising arranging the first image and the second image to be adjacent to each other with a blank space therebetween in a printing area of a page to be printed on a printing medium,
   the synthesized image is generated by synthesizing the text indicating the received utilization purpose, the first image, the second image, and the blank space, in the printing area of the page to be printed such that the text overlaps the first image, the second image, and the blank space, including on the position of the at least one area in the at least one of the first image and the second image of the identification card, wherein text indicating the received utilization purpose is overlapped on the position of the at least one area such that the personal information which is overlapped with the text is still visible, and
   the printer is instructed to print, in the printing area on the printing medium, the synthesized image which includes the first image and the second image with the blank space therebetween along with the overlapped text which is overlapped on the first image, the second image, and the blank space.

25. The non-transitory computer-readable recording medium of claim 24, wherein the program causes the image forming apparatus to overlap the text with the image of the identification card such that the text does not overlap a predetermined element in the image of the identification card.

26. The non-transitory computer-readable recording medium of claim 24, wherein the program causes the image forming apparatus to receive the entry of the utilization purpose by receiving a selection of one option among a plurality of options, or by entering the utilization purpose in handwriting.

27. The non-transitory computer-readable recording medium of claim 24,
   wherein the program causes the image forming apparatus to display a plurality of predetermined options of the utilization purpose of the document to be printed by the printer, and to receive the entry of the utilization purpose by receiving a selection of one option among the plurality of displayed options.

28. The non-transitory computer-readable recording medium of claim 24, wherein the utilization purpose includes an opening of a bank account, a use of a hotel and a purchase of a ticket.

29. The non-transitory computer-readable recording medium of claim 24, wherein the identification card includes a plurality of areas, and the program causes the image forming apparatus to overlap the text so as to be spread on the plurality of areas and to print the overlapped text and the image of the identification card.

30. The non-transitory computer-readable recording medium of claim 24, wherein the personal information includes at least one of a text indicating at least one of a name, date of birth, gender, address and ID number and a photograph.

31. The non-transitory computer-readable recording medium of claim 30, wherein the overlapped text indicating the utilization purpose and at least one of the text indicating at least one of a name, date of birth, gender, address and ID number and the photograph are printed so as to identify each other.

32. The non-transitory computer-readable recording medium of claim 30, wherein a density of the overlapped text indicating the utilization purpose is lower than a density of the text indicating at least one of a name, date of birth, gender, address and ID number.

\* \* \* \* \*